United States Patent [19]

Stanley et al.

[11] Patent Number: 5,409,726
[45] Date of Patent: Apr. 25, 1995

[54] METHOD OF PREPARING REDUCED FAT FOODS

[75] Inventors: Keith D. Stanley; Donald W. Harris; Jeanette A. Little; Robert V. Schanefelt, all of Decatur, Ill.

[73] Assignee: A.E. Staley Manufacturing Co., Decatur, Ill.

[21] Appl. No.: 938,101

[22] Filed: Aug. 28, 1992

Related U.S. Application Data

[63] Continuation-in-part of Ser. No. 908,728, Jul. 6, 1992, which is a continuation of Ser. No. 578,994, Sep. 6, 1990, abandoned, which is a continuation-in-part of Ser. No. 483,208, Feb. 20, 1990, abandoned.

[51] Int. Cl.$^6$ .............................................. A23L 1/05
[52] U.S. Cl. ...................... 426/573; 127/32; 127/71; 252/315.3; 426/578; 426/658; 426/661
[58] Field of Search ............... 426/573, 578, 658, 661, 426/603, 604, 804; 127/29, 32, 33, 36, 38, 39, 40, 58, 65, 69, 70, 71; 252/315.3

[56] References Cited

U.S. PATENT DOCUMENTS

| | | | |
|---|---|---|---|
| 675,822 | 6/1901 | Duryea . | |
| 696,949 | 4/1902 | Duryea . | |
| 2,068,051 | 1/1937 | Canton | 426/578 |
| 2,131,064 | 9/1938 | Musher | 426/633 |
| 2,503,053 | 4/1950 | Kerr | 127/38 |
| 2,791,508 | 5/1957 | Rivoche | 426/573 |
| 2,805,995 | 9/1957 | Adelson | 252/33.6 |
| 2,978,446 | 4/1961 | Battista et al. | 260/212 |
| 3,023,104 | 2/1962 | Battista | 99/1 |
| 3,067,067 | 12/1962 | Etheridge et al. | 127/71 |
| 3,093,486 | 6/1963 | Krett | 99/144 |
| 3,133,836 | 5/1964 | Winfrey et al. | 127/71 |
| 3,197,337 | 7/1965 | Schink | 127/28 |
| 3,219,483 | 11/1965 | Goos et al. | 127/28 |
| 3,351,489 | 11/1967 | Battista | 127/32 |
| 3,532,602 | 10/1970 | Seidman | 195/31 |
| 3,556,942 | 1/1971 | Hathaway | 195/31 |
| 3,582,359 | 6/1971 | Horn | 426/573 |
| 3,586,536 | 6/1971 | Germino et al. | 127/32 |
| 3,600,186 | 8/1971 | Mattson | 99/1 |
| 3,666,557 | 5/1972 | Jensen | 127/32 |
| 3,671,269 | 6/1972 | Germino | 99/139 |
| 3,705,811 | 12/1972 | Yoshida et al. | 99/91 |
| 3,717,475 | 2/1973 | Germino et al. | 99/134 |
| 3,730,840 | 5/1973 | Sugimoto et al. | 195/31 R |
| 3,830,697 | 8/1974 | Yoshida et al. | 195/31 R |
| 3,879,212 | 4/1975 | Yoshida et al. | 106/213 |
| 3,881,991 | 5/1975 | Kurimoto et al. | 195/31 R |
| 3,883,365 | 5/1975 | Forsberg | 127/60 |
| 3,928,062 | 12/1975 | Yamauchi | 127/60 |
| 3,962,465 | 6/1976 | Richter et al. | 426/48 |
| 3,986,890 | 10/1976 | Richter et al. | 127/38 |
| 4,009,291 | 2/1977 | Mitchell | 426/548 |
| 4,069,157 | 1/1978 | Hoover | 210/433 M |
| 4,143,163 | 3/1979 | Hutchison et al. | 426/96 |
| 4,143,174 | 3/1979 | Shah | 426/570 |

(List continued on next page.)

FOREIGN PATENT DOCUMENTS

| | | |
|---|---|---|
| 1016006 | 8/1977 | Canada . |
| 0052899 | 2/1982 | European Pat. Off. . |
| 0237120 | 9/1987 | European Pat. Off. . |

(List continued on next page.)

OTHER PUBLICATIONS

Hanno et al., "Stable Emulsifier for Foods," Chemical Abstract 106:83274y, p. 495 (1987).

Derwent, "Easily Soluble Granular Preparation—Incorporates Dextrin and Glycerol Mixture as Binder Used with Powdery Drus or Food Additives," WPI Abstract, Sect. Ch., Week 7421 (Apr. 25, 1974).

Mitsuo, "Powdery Thickner for Food," Patent Abstracts of Japan, 13:293 (Jul. 6, 1989).

Allmere et al., Derwent Abstract 93-174080 SU1736975 (1992).

(List continued on next page.)

*Primary Examiner*—Donald E. Czaja
*Assistant Examiner*—Leslie Wong
*Attorney, Agent, or Firm*—Arnold, White & Durkee

[57] ABSTRACT

A method of preparing reduced fat foods is provided which employs a fragmented starch hydrolysate. A granular starch hydrolysate or a debranched amylopectin starch precipitate is fragmented to form an aqueous dispersion that is useful in replacing fat in a variety of food formulations. A wet blend of the fragmented starch hydrolysate and a hydrophilic agent is dried. The dry blend can be easily redispersed in water to form a particle gel useful in replacing fat and/or oil in a food formulation.

33 Claims, No Drawings

U.S. PATENT DOCUMENTS

| | | | |
|---|---|---|---|
| 4,192,900 | 3/1980 | Cheng | 426/578 |
| 4,199,374 | 4/1980 | Dwivedi | 127/60 |
| 4,209,503 | 6/1980 | Shah | 424/49 |
| 4,263,334 | 4/1981 | McGinley | 426/573 |
| 4,276,312 | 6/1981 | Merritt | 426/96 |
| 4,291,065 | 9/1981 | Zobel | 426/549 |
| 4,305,964 | 12/1981 | Moran | 426/99 |
| 4,308,294 | 12/1981 | Rispoli | 426/564 |
| 4,423,084 | 12/1982 | Trainor | 426/589 |
| 4,477,480 | 10/1984 | Seidel et al. | 426/578 |
| 4,492,714 | 1/1985 | Cooper | 426/602 |
| 4,510,166 | 4/1985 | Lenchin et al. | 426/565 |
| 4,533,254 | 8/1985 | Cook et al. | 366/176 |
| 4,536,408 | 8/1985 | Morehouse et al. | 426/250 |
| 4,551,177 | 11/1985 | Trubiano et al. | 106/210 |
| 4,557,939 | 12/1985 | Sander et al. | 426/453 |
| 4,560,559 | 12/1985 | Ottenburg | 426/19 |
| 4,587,131 | 5/1986 | Bodor | 426/603 |
| 4,591,507 | 5/1986 | Bodor | 426/604 |
| 4,643,773 | 2/1987 | Day | 127/30 |
| 4,670,272 | 6/1987 | Chen | 426/573 |
| 4,726,957 | 2/1988 | Lacourse | 426/578 |
| 4,728,526 | 3/1988 | Avera | 426/633 |
| 4,744,987 | 5/1988 | Mehra et al. | 424/156 |
| 4,761,292 | 8/1988 | Augustine et al. | 426/321 |
| 4,787,939 | 11/1989 | Barker | 127/37 |
| 4,810,307 | 3/1989 | Caton | 127/63 |
| 4,810,646 | 3/1989 | Jamas | 435/101 |
| 4,814,195 | 3/1989 | Yokohama | 426/633 |
| 4,828,868 | 5/1989 | Lasdon | 426/633 |
| 4,832,977 | 5/1989 | Avera | 426/633 |
| 4,859,484 | 8/1989 | Bielskis et al. | 426/573 |
| 4,869,919 | 9/1989 | Lowery | 426/604 |
| 4,885,180 | 12/1989 | Cochran | 426/241 |
| 4,886,678 | 12/1989 | Chiu | 426/578 |
| 4,911,946 | 3/1990 | Singer | 426/658 |
| 4,917,915 | 4/1990 | Cain | 426/573 |
| 4,937,091 | 6/1990 | Zallie | 426/582 |
| 4,942,055 | 7/1990 | Avera | 426/633 |
| 4,948,615 | 8/1990 | Zallie | 426/573 |

FOREIGN PATENT DOCUMENTS

| | | |
|---|---|---|
| 0298561 | 1/1989 | European Pat. Off. |
| 0327120 | 8/1989 | European Pat. Off. |
| 0327288 | 8/1989 | European Pat. Off. |
| 0340035 | 11/1989 | European Pat. Off. |
| 0367064 | 5/1990 | European Pat. Off. |
| 0372184 | 6/1990 | European Pat. Off. |
| 0387940 | 9/1990 | European Pat. Off. |
| 0420314 | 4/1991 | European Pat. Off. |
| 0420315 | 4/1991 | European Pat. Off. |
| 0427312 | 5/1991 | European Pat. Off. |
| 0430329 | 6/1991 | European Pat. Off. |
| 0443844A1 | 8/1991 | European Pat. Off. |
| 0443844 | 8/1991 | European Pat. Off. |
| 0470870 | 2/1992 | European Pat. Off. |
| 0480433 | 4/1992 | European Pat. Off. |
| 0486936 | 5/1992 | European Pat. Off. |
| 0529894A1 | 3/1993 | European Pat. Off. |
| 142646A | 7/1980 | German Dem. Rep. |
| 161178A | 5/1985 | German Dem. Rep. |
| 110957 | 4/1897 | Germany |
| 60-160833 | 8/1985 | Japan |
| 3-296501 | 12/1991 | Japan |
| 4-46901 | 2/1992 | Japan |
| 2247242 | 2/1992 | United Kingdom |
| WO87/04465 | 7/1987 | WIPO |
| WO89/12403 | 12/1989 | WIPO |
| WO90/00010 | 1/1990 | WIPO |
| WO90/06343 | 6/1990 | WIPO |
| WO90/15147 | 12/1990 | WIPO |
| WO91/01091 | 2/1991 | WIPO |
| WO91/01092 | 2/1991 | WIPO |
| 91/07106 | 5/1991 | WIPO |
| 91/12728 | 9/1991 | WIPO |
| 92/02614 | 2/1992 | WIPO |
| WO92/21703 | 12/1992 | WIPO |

OTHER PUBLICATIONS

Tegge, "Produkte der sauren Stärkehydrolyse", Die Stärken, pp. 244–246 (1981). (English translation).

"Low fat ground beef patties", brochure, A. E. Staley Mfg. Co. (Oct. 1991).

"Low-fat pork sausage patty", formula sheet CFSF7 196211, A. E. Staley Mfg. Co.

"New generation of foods with reduced fat", Food Engineering, pp. 23–26 (Jan. 1990).

"Rannie High Pressure Laboratory Homogenizer", service manual, Rannie a/s, Roholmsvej 8, DK-2620, Denmark (1988).

"Staley Formulation of Food Starch-Modified", new product review presented to U.S. Food and Drug Adminstration by A. E. Staley Mfg. Co. (Nov. 1990).

Ambler, "Centrifugation", Handbook of Separation Techniques for Chemical Engineers, pp. 4≧60 to 4–88 (McGraw Hill 1988).

Atwell et al., "Characterization of quinoa starch", Cereal Chemistry, vol. 60, pp. 9–11 (1983).

Dickinson, "Particle gels", Chemistry & Industry, pp. 595–599 (Oct. 1990).

Duxbury, "Modified food starches partially replace

U.S. PATENT DOCUMENTS

| | | | |
|---|---|---|---|
| 4,954,178 | 9/1990 | Caton | 127/32 |
| 4,957,750 | 9/1990 | Cochran | 426/19 |
| 4,962,094 | 10/1990 | Jamas | 514/54 |
| 4,971,723 | 11/1990 | Chiu | 426/578 X |
| 4,981,709 | 1/1991 | Furcsik | 426/565 |
| 4,988,531 | 1/1991 | Moore | 426/578 |
| 4,990,355 | 2/1991 | Gupta | 426/602 |
| 5,034,240 | 7/1991 | Tanaka | 426/607 |
| 5,035,904 | 7/1991 | Huang | 426/243 |
| 5,037,929 | 8/1991 | Rajagopolan et al. | 426/578 |
| 5,051,271 | 9/1991 | Iyengar et al. | 426/658 |
| 5,094,872 | 3/1992 | Furcsik | 426/578 |
| 5,104,674 | 4/1992 | Chen | 426/573 |
| 5,106,644 | 4/1992 | El-Nokaly | 426/603 |
| 5,110,612 | 5/1992 | Quarles | 426/573 |
| 5,131,953 | 7/1992 | Kasica et al. | 127/65 |
| 5,137,742 | 8/1992 | Bakal | 426/589 |
| 5,147,665 | 9/1992 | Furcsik | 426/19 |
| 5,192,569 | 3/1993 | McGinley et al. | 426/96 |

OTHER PUBLICATIONS fats, oils & provide smooth texture", Food Processing, pp. 86–88 (Nov. 1990).

Duxbury, "Fat-sparing starch can replace 100% fat/oil for 96% calorie reduction", Food Processing, p. 38 (Dec. 1990).

Dziezak, "Membrane separation technology offers processors unlimited potential", Food Technology, pp. 108–113 (Sep. 1990).

Faulkner et al., "Size reduction", Encyclopedia of Chemical Technology, vol. 21, pp. 132–162 (Kirk Othmer eds., John Wiley & Sons, 1983).

Ghiasi et al., "Effects of flour components and dough ingredients on starch gelatinization", Cereal Chemistry, vol. 60, No. 1, pp. 58–61 (1983).

Giese, "Developing low-fat meat products", Food Technology, pp. 100–108 (Apr. 1992).

Jane et al., "Structure studies of amylose-V complexes and retrograded amylose by action of alpha amylases, and a new method for preparing amylodextrins", Carbohydrate Research, vol. 132, pp. 105–118 (1984).

Kerr, Chemistry and Industry of Starch, 2d ed., pp. 564–567 (Academic Press 1950).

Knightly, "The evolution of softeners and conditioners used in baked foods", The Bakers Digest, pp. 64–75 (Oct. 1973).

Lansky et al., "Properties of the fractions and linear subfractions from various starches", vol. 71, pp. 4066–4075 (1949).

Larsson et al., "Annealing of starch at an intermediate water content", Starch/Starke, vol. 43, No. 6, pp. 227–231 (Jun. 1991).

Lavanchy et al., "Centrifugal separation", Encyclopedia of Chemical Technology, vol. 5, pp. 194–233 (Kirk-Othmer, eds., John Wiley & Sons, 3d ed., 1979).

Manley, Technology of Biscuits, Crackers and Cookies, pp. 335–347 (Ellis Horwood 1983).

Mason, "Chemistry with ultrasound", Critical Reports on Applied Chemistry, vol. 28, pp. 1–26, 91–98, 159–187 (Elsevier Science Publishers 1990).

Matthews, Legumes: Chemistry, Technology, and Human Nutrition, pp. 226–229 (Marcel Dekker 1989).

Matz, Cookie and Cracker Technology, pp. 163–167 (AVI Publishing 1968).

Mussulman et al., "Electron microscopy of unmodified and acid-modified corn starches", Cereal Chemistry, vol. 45, pp. 162–171 (1968).

Pancoast et al., Handbook of Sugars, pp. 157–287 (AVI Publishing 1980).

Patterson, Hydrogenation of Fats and Oils, pp. 44–48, 173–182, 291–304 (Applied Science Publishers, 1983).

Pszczola, "Oat-bran-based ingredient blend replaces fat in ground beef and pork sausage", Food Technology, pp. 60–66 (Nov. 1991).

Richards, Breads, Rolls and Sweet Doughs, pp. 92–95 (Peacock Business Press, 1973).

Russell et al. "Characterization of resistant starch from wheat and maize", Journal of Cereal Science, vol. 9, pp. 1–15 (1989).

Savage et al., "Effects of certain sugars and sugar alcohols on the swelling of cornstarch granules", Cereal Chemistry, vol. 55, No. 4, pp. 447–454 (1978).

Sievert et al., "Enzyme resistant starch. I. Characterization and evaluation of enzymatic, thermoanalytical, and microscopic methods", Cereal Chemistry, vol. 66, pp. 342–347 (1989).

Spies et al., "Effect of sugars on starch gelatinization", Cereal Chemistry, vol. 59, No. 2, pp. 128–131 (1982).

Stadelman et al., Egg and Poultry Meat Processing, pp. 52–63 (Ellis Horwood 1988).

Stute, "Hydrothermal modification of starches: the difference between annealing and heat/moisture-treatment", Starch/Staerke, vol. 44, pp. 205–214 (1992).

Swientek, "'Microfluidizing' technology enhances emulsion stability", Food Processing, pp. 152–153 (Jun. 1990).

Taki, "Functional ingredient blend produces low-fat meat products to meet consumer expectations", Food Technology, pp. 70–74 (Nov. 1991).

OTHER PUBLICATIONS

Trout, "Pasteurization", Encyclopedia of Food Science, pp. 600–604 (Peterson et al. eds., AVI Publ. Co., 1978).

Wang, "Meat processing I", Encyclopedia of Food Engineering, pp. 545–557 (AVI Publishing 1986).

Whistler et al. "Effect of acid hydrolysis on the retrogradation of amylose", Cereal Chemistry, vol. 25, No. 6, pp. 418–424 (1948).

Wilhoft, "Recent developments on the bread staling problem", The Bakers Digest, pp. 14–20 (Dec. 1973).

Yamaguchi et al., "Electron microscopic observations of waxy maize starch", Journal of Ultrastructure Research, vol. 69, pp. 249–261 (1979).

Paselli SA2; "The Natural Alternative to Fats and Oils" (Avebe b.a., Foxhol, Holland, Ref. No. 05.12.31.167 EF).

R. L. Whistler, et al., Starch: Chemistry and Technology, pp. 25–35 (Academic Press, Inc., New York, N.Y., 1984).

J. Bouchard, et al., "High-Performance Liquid Chromatographic Monitoring of Carbohydrate Fractions in Partially Hydrolyzed Corn Starch", J. Agric. Food Chem., vol. 36, pp. 1188–1192 (1988).

F. Reuther, et al., "Structure of Maltodextrin Gels—A Small Angle X-Ray Scattering Study", Colloid and Polymer Science, 261, 271–276 (1983).

S. Nara, et al., "Study on Relative Crystallinity of Moist Potato Starch", Starke/Starch, vol. 30, pp. 111–114 (1978).

S. Richardson, "Molecular Mobilities of Instant Starch Gels Determined by Oxygen-17 and Carbon-13 Nuclear Magnetic Resonance", Journal of Food Science, vol 53, No. 4, pp. 1175–1180 (1988).

C. Luu, et al., "Model Structure for Liquid Water", Travaux de la Societe de Pharmacie de Montpellier, vol. 41, No. 3, pp. 203–212 (1981).

D. C. White and G. N. Lauer, "Predicting Gelatinization Temperatures of Starch/Sweetener Systems for Cake Formulation by Differential Scanning Calorimetry. I. Development of a Model", Cereal Foods World, vol. 35, No. 8, pp. 728–731 (Aug. 1990).

C. Orr, "Size Measurment of Particles", Encyclopedia of Chemical Technology, vol. 21, pp. 106–131 (Kirk-Othmer, eds., John Wiley & Sons, Inc., New York, N.Y., 1983).

D. R. Paul and C. Morel, "Membrane Technology", Encyclopedia of Chemical Technology, vol. 15, pp. 92–131 (Kirk-Othmer, eds., John Wiley & Sons, Inc., New York, N.Y., 3d ed., 1981).

P. R. Klinkowski, "Ultrafiltration" Encyclopedia of Chemical Technology, vol. 23, pp. 439–461 (Kirk-Othmer, eds., John Wiley & Sons, Inc., New York, N.Y., 3d ed., 1983).

Solve Tough Process Filtration Problems with Ceraflo Ceramic Systems", a technical bulletin, Lit. No. SD113, Feb. 1989 89–418, published (1989) by Millipore Corporation, Bedford, Mass.

H. Reuter, "Homogenization", Encyclopedia of Food Science, pp. 374–376, (M. S. Peterson and A. H. Johnson, eds., AVI Publ. Co., Westport, Conn., 1978).

L. H. Rees and W. D. Pandolfe, "Homogenizers", Encyclopedia of Food Engineering, pp. 467–472 (C. W. Hall, et al., eds., AVI Publ. Co., Westport, Conn., 1986).

W. C. Griffin, "Emulsions", Encyclopedia of Chemical Technology, vol. 8, pp. 900–930 (Kirk-Othmer eds., John Wiley & Sons, Inc., New York, N.Y., 3d ed., 1979).

J. N. BeMiller, "Gums", Encyclopedia of Food Science and Technology, vol. 2, pp. 1338–1343 (John Wiley & Sons, Inc., New York, N.Y., 1992).

A. Teot, "Resins, Water-Soluble", Encyclopedia of Chemical Technology, vol. 20, pp. 207–230 (Kirk-Othmer, eds., John Wiley & Sons, Inc., New York, N.Y., 1982, 2d ed.).

T. H. Applewhite, "Fats and Fatty Oils", Encyclopedia of Chemical Technology, vol. 9, pp. 795–831 (Kirk-Othmer, eds., John Wiley & Sons, Inc., New York, N.Y., 3d ed., (1980).

Food Labelling; Serving Sizes, 55 Fed. Reg. 29517 (1990).

Food Labelling; Definitions of the Terms Cholesterol Free, Low Cholesterol and Reduced Cholesterol, 55 Fed. Reg. 29456 (1990).

K. Koizumi, et al., "High-Performance Anion-Exchange Chromatography of Homogeneous D-Gluco-Oligosaccharides and -Polysaccharides (Polymerization Degree equal to or greater than 50) With Pulsed Amperometric Detection", Journal of Chromatography, 46, pp. 365–373 (1989).

OTHER PUBLICATIONS

A. H. Young, "Evaluation of Microcrystals Prepared from MIRA-QUIK C in the Pilot Plant Spray Dried in the Presence of Sodium Carboxymethyl-cellulose (C9-112)", Project Report No. RD 73-17 of A. E. Staley Manufacturing Company.

"C9-112 Microcrystalline Starch", a product bulletin of A. E. Staley Manufacturing Company, Decatur, Ill.

D. Duxbury, "Pre-Hydrated Gums Eliminate Lumping, Long Hydration Times", *Food Processing* (Jun. 1992).

M. Falkiewicz, "Avicel in Suspensions—Dispersion, Rheology and Colloid Science", *Soap, Cosmetics, Chemical Specialties*, pp. 27–34 (Apr. 1979).

O. A. Battista et al., "Microcrystalline Cellulose", *Industrial and Engineering Chemistry*, vol. 54, pp. 20–29 (1962).

"Avicel RC 581 Technical Bulletin", Bulletin No. RC-11 of FMC Corporation, Marcus Hook, Pa., Nov. 1969-1M.

"Avicel Microcrystalline Cellulose; the Non-caloric Ingredient" a bulletin of American Viscose Corporation, Marcus Hook, Pa. (later a division of FMC Corporation).

"Avicel RC-591 in Foods", Bulletin No. RC-22, FMC Corporation, Marcus Hook, Pa. (May 1972).

"Avicel RC in Bakery Products", Bulletin No. RC-35, FMC Corporation, Marcus Hook, Pa.

"Avicel RC in Canned Foods", Bulletin No. RC-31, FMC Corporation, Marcus Hook, Pa. (May 1972).

"Avicel Pricing", a bulletin apparently of American Viscose Corporation, Marcus Hook, (later a division of FMC Corporation).

"STELLAR Fat Replacer", a technical data sheet, published by A. E. Staley Manufacturing Company, TDS 513 192250.

"STELLAR Fat Replacer; Structure", a technical information bulletin published by A. E. Staley Manufacturing Company, TIB 29 195060.

"STELLAR Fat Replacer; Handling, Storage and Preparation", a technical information bulletin published by A. E. Staley Manufacturing Company, TIB 28 195060.

O. A. Battista et al., "Colloidal Macromolecular Phenomena. Part II. Novel Microcrystals of Polymers", *Journal of Applied Polymer Science*, vol. 11, pp. 481–498 (1967).

N. Z. Erdi et al., "Rheological Characteristics of Polymeric Micro-crystal Gels", *Journal of Colloid and Interface Science*, vol. 28, pp. 36–47.

"Nepol Amylose", Market Development Bulletin No. 101, A. E. Staley Mfg. Company (1962).

J. Jane et al., "Preparation and Properties of Small-Particle Corn Starch", *Cereal Chemistry*, vol. 69, pp. 280–283 (1992).

O. B. Wurzburg, *Modified Starches: Properties and Uses*, pp. 18–23, 38–40, 244–245, and 251–252 (CRC Press, Inc., Boca Raton, Fla., 1986).

G. R. Sanderson, "Polysaccharides in Foods", *Food Technology*, pp. 50–57 and 83 (Jul. 1981).

"Gums and Starches Bulk Up Low-Cal Foods", *Food Engineering*, (Jan. 1990).

"STA-SLIM starches", a technical data sheet published by A. E. Staley Manufacturing Company, Decatur, Ill., TDS 507 096060.

"Reduced-Oil Salad Dressings", a technical publication of the A. E. Staley Manufacturing Company, Decatur, Ill.

N. Krog, "Functions of Emulsifiers in Food Systems", *J. Am. Oil Chemists' Society*, vol. 54, pp. 124–131 (1977).

J. D. Dziezak, "Emulsifiers: The Interfacial Key to Emulsion Stability", *Food Technology*, vol. 42, No. 10, pp. 171–186 (1988).

5,409,726

METHOD OF PREPARING REDUCED FAT FOODS

This application is a continuation-in-part of U.S. application Ser. No. 07/908,728, filed Jul. 6, 1992, which was a continuation of U.S. application Ser. No. 07/578,994, filed Sep. 6, 1990, now abandoned, which was a continuation-in-part of U.S. application Ser. No. 07/483,208, filed Feb. 20, 1990, now abandoned.

FIELD OF THE INVENTION

This invention relates to food formulations in which at least a portion of the fat and/or oil is replaced by a carbohydrate.

BACKGROUND OF THE INVENTION

U.S. Pat. No. 4,510,166 (Lenchin, et al.) discloses converted starches having a DE less than 5 and certain paste and gel characteristics which are used as a fat and/or oil replacement in various foods, including ice cream and mayonnaise. The converted starches are described as dextrins, acid-converted starches (fluidity starches), enzyme-converted starches and oxidized starches. It is also disclosed that if the converted starches are not rendered cold-water soluble by the conversion, they are pregelatinized prior to use or cooked during use.

A product bulletin entitled "Paselli SA2; The Natural Alternative to Fats and Oils" (Avebe b.a., Foxhol, Holland, Ref. No. 05.12.31.167 EF) discloses the use of a low-DE-hydrolysate (DE less than 3) made from potato starch as a replacement for fifty percent of the fat with an amount of the low-DE-potato starch hydrolysate plus water (starch hydrolysate at 28% dry solids) equal to the amount of fat replaced.

U.S. Pat. Nos. 3,962,465 (Richter, et al.) and 3,986,890 (Richter, et al.) disclose the use of thermoreversible gels of a starch hydrolysate (formed by enzymatic hydrolysis) as a substitute for fat in a variety of foods, including cake creams and fillings, mayonnaise and remoulades, cream cheeses and other cheese preparations, bread spreads, pastes, meat and sausage products, and whipped cream.

The preparation of ready-to-spread frostings having reduced levels of calories is disclosed in U.S. Pat. No. 4,761,292 (Augustine, et al.). The patent discloses a frosting which contains (a) about 40 to 85 weight percent sugar, at least about 20 weight percent of which comprises fructose; (b) about 1 to 12 weight percent of a granular starch having a cold-water solubility of greater than 50 weight percent and a fat content of less than 0.25 weight percent; (c) about 5 to 30 weight percent fat; and (d) about 10 to 30 weight percent water. The patent also discloses, at column 5, lines 25-38, that the preferred frostings contain 8 to 18 weight percent fat in comparison to conventional frostings which routinely contain about 18 to 30 weight percent fat.

SUMMARY OF THE INVENTION

This invention relates to a method of preparing a dry blend of a major amount of a fragmented starch hydrolysate capable of forming a particle gel in aqueous dispersion and a minor amount of a hydrophilic agent selected from the group consisting of hydrophilic polymers, alkane polyols, surfactants, and mixtures of two or more thereof, effective to improve the redispersibility of said dry blend in a major amount of water comprising:

mixing a minor amount of a hydrophilic agent with a major amount of a fragmented starch hydrolysate in an aqueous environment to form a wet blend thereof, drying said wet blend at a temperature low enough to prevent the dissolution of a major proportion by weight of said fragmented starch hydrolysate in the water of said aqueous environment, said minor amount of hydrophilic agent being effective to improve the redispersibility of said fragmented starch hydrolysate when a minor amount of said blend is dispersed in a major amount of water.

The term "hydrophilic agent" as used hereinafter, shall mean a member selected from the group consisting of hydrophilic polymers, alkane polyols, surfactants, and mixtures of two or more thereof, effective to improve the redispersibility of said dry blend in a major amount of water as discussed more fully hereinafter.

This invention also relates to a composition of matter comprising a major amount of a fragmented starch hydrolysate capable of forming a particle gel in aqueous dispersion and a minor amount of a hydrophilic agent, said minor amount of hydrophilic agent being effective to improve the redispersibility of said fragmented starch hydrolysate when a minor amount of said blend is dispersed in a major amount of water.

This invention also relates to a method of forming a particle gel comprising mixing a composition of matter comprising a major amount of a fragmented starch hydrolysate capable of forming a particle gel in aqueous dispersion and a minor amount of a hydrophilic agent, said minor amount of hydrophilic polymer being effective to improve the redispersibility of said fragmented starch hydrolysate when a minor amount of said blend is dispersed in a major amount of water, wherein the shear employed to form such particle gel is less than the shear needed to form a particle gel having the same gel strength as a particle of the fragmented starch hydrolysate alone.

This invention also relates to a method of formulating a food containing a fat and/or oil ingredient comprising replacing at least a substantial portion of said fat and/or oil ingredient with a composition of matter comprising a major amount of a fragmented starch hydrolysate capable of forming a particle gel in aqueous dispersion and a minor amount of a hydrophilic agent, said minor amount of hydrophilic polymer being effective to improve the redispersibility of said fragmented starch hydrolysate when a minor amount of said blend is dispersed in a major amount of water.

This invention also relates to a food formulation having a reduced level of fat and/or oil comprising a mixture of a foodstuff and a blend composition as a replacement for at least a substantial portion of the fat and/or oil of said food formulation, said blend composition comprising a major amount of a fragmented starch hydrolysate capable of forming a particle gel in aqueous dispersion and a minor amount of a hydrophilic agent, said minor amount of hydrophilic agent being effective to improve the redispersibility of said fragmented starch hydrolysate when a minor amount of said blend is dispersed in a major amount of water.

The use of the terms "major" and "minor" in context together in this specification is meant to imply that the major component is present in a greater amount by weight than the minor component, and no more nor less should be inferred therefrom unless expressly noted otherwise in context.

DETAILED DESCRIPTION OF THE INVENTION

This invention employs a fragmented starch hydrolysate capable of forming a particle gel upon fragmentation of the starch hydrolysate in an aqueous medium. In certain embodiments the fragmented starch hydrolysate is a granular starch hydrolysate, i.e. a starch hydrolysate which has not been substantially gelatinized and, thus, retains certain structural organizational aspects of the native granular starch from which it was derived, as discussed more fully below. In other embodiments, the fragmented starch hydrolysate is a debranched starch hydrolysate which has been gelatinized prior to debranching. This detailed description will first deal with the granular starch hydrolysate and then turn to the debranched starch hydrolysates.

The fragmented, granular starch hydrolysate is made by the sequential acid-hydrolysis and fragmentation of a granular starch material, preferably derived from a starch having a major proportion of amylopectin. Starch is generally comprised of a highly-branched glucan having $\alpha$-1,4 and $\alpha$-1,6 linkages, denominated amylopectin, and a substantially linear glucan, having almost exclusively $\alpha$-1,4 linkages, denominated amylose. Methods of determining the amounts of each are referenced in R. L. Whistler, et al., *Starch: Chemistry and Technology*, pp. 25-35 (Academic Press, Inc., New York, N.Y., 1984), the disclosure of which is incorporated by reference. Examples of starches having a major proportion of amylopectin include the common non-mutant starches of cereals and legumes, e.g. corn, wheat, rice, potato and tapioca, and mutant varieties comprised of a major proportion of amylopectin, e.g. waxy maize. Preferred for use herein are common corn starch and waxy maize starch.

As used herein, the term "granular starch" refers to a starch composition in which the native granular structure is retained. Thus, this term, without further limitations, includes common starches and starches isolated from mutant varieties, e.g. waxy maize starch and high amylose corn starch. High amylose corn starch is commercially available in native granular form and having an amylose content within the range of about 50% to about 80%. For example, native granular starches, one with an amylose content of 55% to 60% and the other with about 70%, are available from National Starch and Chemical Corporation, Bridgewater, N.J., HYLON ™ and HYLON ™ VII, respectively. The starch should be in the native granular form to be useful as a starting material. This form is resistant to hydration and/or gelatinization during the acid-hydrolysis, and thus, fragments of the starch will retain many of the structural features of the native granule, e.g. the lamellae resulting from the growth pattern of the granule. By "gelatinization temperature" is meant the temperature at which a majority (by weight) of the granular starch starting material is "gelatinized" or "pasted". In other words, a product in which the gelatinization occurs with respect to a minor amount of the granular starch starting material is within the scope of the granular starch hydrolysate, unless otherwise noted.

Various pretreatments of the native granule starting material can be performed so long as the resistance to gelatinization during acid-hydrolysis is preserved. A particularly useful pretreatment is defatting of the granule, e.g., by an alkaline wash as described in U.S. Pat. No. 4,477,480 (Seidel, et al.), the disclosure of which is incorporated herein by reference, and/or a solvent extraction as described in U.S. Pat. Nos. 3,717,475 and 3,586,536 (Germino et al.), the disclosures of which are incorporated by reference. The granular starch from which the hydrolysate is made should generally contain less than about 1.5% fatty acids and proteins. Because the hydrolysis is accomplished in a predominantly aqueous medium and is typically washed with only water, the hydrolysis will not remove any substantial portion of the lipids present in the starch. Further, because a substantial portion of the starch is hydrolyzed to products soluble in the aqueous medium and subsequent wash water, the hydrolysis and washing will remove starch solids and, thus, result in a lipid content on a weight percentage basis that is higher for the hydrolysate than the parent starch.

The acid-hydrolysis of the granular starch is performed to permit mechanical disintegration of the granular starch hydrolysate residue to a degree that will allow the formation of an aqueous dispersion that is salve-like. The hydrolysate will be capable upon mechanical disintegration of forming an aqueous dispersion (at about 20% hydrolysate solids) having a yield stress of from about 100 to about 1,500 pascals (for example, from about 200 to about 800 pascals or from about 200 to about 600 pascals), but more preferably from about 400 to about 1,500 pascals, and most preferably at least about 500 pascals.

The yield stress of an aqueous dispersion of fragmented starch hydrolysate has been found to correlate well with the fat-like consistency of the aqueous dispersion. In other words, if the yield stress is in an appropriate range, the aqueous dispersion will generally exhibit a fat-like consistency. However, yield stress may not correlate well with properties other than consistency. For example, a sample with an appropriate yield stress may exhibit a gritty mouthfeel (i.e. grittiness) due to aggregation of the insoluble hydrolysate particles (e.g., as a result of freeze-thaw of an aqueous dispersion of fragmented starch hydrolysate). Further, the correlation between yield stress and fat-like consistency may not hold in the converse for all fragmented starch hydrolysates described herein. In other words, a particular fragmented starch hydrolysate may exhibit a fat-like consistency under some conditions, but not exhibit an appropriate yield stress. In sum, while yield stress exhibits a useful correlation with fat-like consistency, yield stress is not believed to be a perfect predictor of fat mimicking properties of a fragmented starch hydrolysate.

An aqueous dispersion of fragmented granular starch hydrolysate should exhibit rheological properties characteristic of a particle gel. One measure of these properties is provided by measuring the dynamic elastic modulus (G') over a range of shear strain. A particle gel will exhibit a transition in G' versus shear strain from a substantially constant G' to a decreasing G' as shear strain increases. The transition indicates fracture of the particle network within the particle gel and is typically a sharp transition at a relatively low (compared to a polymer gel) shear strain. The particle gels useful herein will typically exhibit such a transition at less than about 50 millistrain, and preferably less than about 20 millistrain.

In general, the starch hydrolysate will have a peak molecular weight as measured by gel permeation chromatography of from about 2,000 g/mol to about 10,000 g/mol, preferably from about 3,500 g/mol to about 5,000 g/mol and more preferably from about 4,500 g/mol to about 5,000 g/mol.

It has been found that the weight average molecular weight ($M_W$) as measured by gel permeation chromatography exhibits a better correlation (better than PMW) to the yield stress of an aqueous dispersion of the fragmented starch hydrolysate. The $M_W$ should generally range from about 3,000 to about 12,000, preferably about 4,000 to about 7,500 and more preferably 4,500 to about 6,500. Of course, $M_W$ also correlates to peak molecular weight, but some factors (e.g., the efficiency of washing of the product centrifuge cake which can affect the cold-water solubles content of the product) can affect the degree of correlation between $M_W$ and peak molecular weight from lot to lot of a given production run. Molecular weights of starch hydrolysates can be measured by the procedure described by J. Bouchard, et al., "High-Performance Liquid Chromatographic Monitoring of Carbohydrate Fractions in Partially Hydrolyzed Corn Starch", *J. Agric. Food Chem.*, Vol. 36, pp. 1188–1192 (1988), the disclosure of which is incorporated herein by reference.

The Dextrose Equivalent (by Lane-Eynon method DE) of the starch hydrolysate will vary based on the precise degree of hydrolysis and the efficiency of the washing of the starch hydrolysate, but will typically be greater than about 3, more typically greater than about 5, e.g. from about 5.0 to 7.0.

The starch hydrolysates, and fragmented dispersions thereof, can be analyzed by a variety of techniques. For example, low angle (or "small angle") X-ray scattering experiments can be performed on an aqueous dispersion of a fragmented starch hydrolysate and the results (particularly those in the Porod region of the spectrum) may show an ordering (or lack thereof) in the dispersion in the range of tens to hundreds of angstroms. Such low-angle X-ray scattering techniques are described in F. Reuther, et al., "Structure of Maltodextrin Gels—A Small Angle X-Ray Scattering Study", *Colloid and Polymer Science*, 261, 271–276 (1983), the disclosure of which is incorporated by reference. Further, wide angle X-ray scattering techniques (e.g. those described by S. Nara, et al., "Study on Relative Crystallinity of Moist Potato Starch", *Starke/Starch*, Vol. 30, pp. 111–114 (1978)) can be performed on the starting starch, the starch hydrolysate powder and on the aqueous dispersion of fragmented starch hydrolysate to examine the effects of hydrolysis and/or fragmentation on the ordering of the starch material in the range of about 1–15 angstroms, i.e., ordering related to the distances between atoms in the starch material.

Nuclear magnetic resonance techniques (e.g. those described by S. Richardson, "Molecular Mobilities of Instant Starch Gels Determined by Oxygen-17 and Carbon-13 Nuclear Magnetic Resonance", *Journal of Food Science*, Vol. 53, No. 4, pp. 1175–1180 (1988)) can be used to show the electronic environment of atomic nuclei in the starch hydrolysate, e.g. carbon-13, and thus give information relating to molecular structure and disposition (e.g. carbohydrate ring conformations, Vander Waals bonding, etc.). The technique of measuring water mobility (or immobility, its inverse) by oxygen-17 NMR may be supplemented with Raman infrared spectroscopy techniques in the "water-band" of the infra-red portion of the spectrum (e.g. techniques such as those described by C. Luu, et al., "Model Structure for Liquid Water", *Travaux de la Societe de Pharmacie de Montpellier*, Vol. 41, No. 3, pp. 203–212 (1981), the disclosure of which is incorporated herein by reference). Differential Scanning Calorimetry (DSC) can be employed to examine the solubility of the starch hydrolysate in water (before and/or after fragmentation) over various temperatures. Such DSC techniques are described, for example, by D. C. White and G. N. Lauer, "Predicting Gelatinization Temperatures of Starch/Sweetener Systems for Cake Formulation by Differential Scanning Calorimetry. I. Development of a Model", *Cereal Foods World*, Vol. 35, No. 8, pp. 728–731 (August 1990), the disclosure of which is incorporated by reference.

It should also be noted that the mean particle size of the starch hydrolysate, before and after fragmentation, can be measured by a variety of different means. However, the utility of such information must be considered carefully in view of the considerations noted by C. Orr, "Size Measurement of Particles", *Encyclopedia of Chemical Technology*, Vol. 21, pp. 106–131 (Kirk-Othmer, eds., John Wiley & Sons, Inc., New York, N.Y., 1983), the disclosure of which is incorporated by reference. With this caveat in mind, it should be mentioned that the mean particle size, as measured by certain techniques, of the starch hydrolysate may appear to be substantially the same, e.g. about 10 microns (by light scattering techniques). However, when the aqueous dispersion of fragmented starch hydrolysate is analyzed to determine the surface area of the fragments, a mean particle size on the order of 50 angstroms to 200 angstroms may be inferred therefrom. Without wishing to be bound by any particular theory, unless otherwise noted, this particle size information suggests that the aqueous dispersion of fragmented starch hydrolysate contains agglomerates of fragments, such agglomerates being on the order of 10 microns in size and being comprised of individual fragments on the order of 50–200 angstroms. Further, it may be theorized that the agglomerates are malleable in the dispersion such that they deform (and perhaps undergo inter-agglomerate exchange of fragments) in a manner that imparts the property of plasticity to the dispersion. This plasticity may then give rise to the fat-like or salve-like consistency of the dispersion. This theory may also account for the fat-like mouth-clearing of the dispersion observed in many foods, e.g. frozen desserts. However, it should again be noted that these theories must be considered as such, unless otherwise expressly noted herein.

The acid hydrolysis can be accomplished in an essentially aqueous slurry of the starch. Typical conditions will include a starch slurry at 30% to 40% starch solids in 0.25N to 2.5N mineral acid (e.g. hydrochloric acid or sulfuric acid) maintained at a temperature of from about 50° C. to about 70° C., preferably from about 55° C. to about 60° C., more preferably from about 57° C. to about 62° C., for from about 8 to about 20 hours, preferably from about 10 to about 16 hours, when the acid is about 1N (and from about 8 to about 48 hours, preferably from about 20 to about 30 hours when the acid is about 0.5N). Variations within and around the scope of these parameters to optimize a particular set of conditions in conjunction with the means and degree of mechanical disintegration described below will be within the skill of the art given the examples set forth below.

It is believed that the moderate temperatures employed will reduce the amounts of reversion products produced during hydrolysis. Because reversion products tend to contribute off-flavors to the hydrolysate, minimizing their production should enhance the organoleptic acceptability of the hydrolysate by ensuring the production of a hydrolysate with a desirably bland taste. Likewise, the moderate reaction times will reduce opportunity for the development of rancidity in the hydrolysate that may occur over longer reaction times, e.g., more than a few days, as a result of the breakdown of even small amounts of residual lipids.

The hydrolysis medium is essentially aqueous. Generally, it will contain no more than a trace, if any, of organic solvents (e.g, ethanol). Organic solvents may react with the saccharide by-products (e.g., dextrose to form at least traces of ethyl glucoside), may otherwise affect the hydrolysis reaction (e.g. solvent effects) and/or may contaminate the starch hydrolysate product.

The progress of the hydrolysis may be followed by taking small samples of slurry from an in-progress batch of the starch hydrolysate, adjusting the pH of the slurry (e.g. to 4-5), isolating the solid starch hydrolysate residue from the slurry sample, and mechanically disintegrating the residue under the conditions intended for the batch as a whole. The yield stress of a 20% aqueous dispersion can then be measured to determine if the acid-hydrolysis has progressed to a desired degree. Also, samples of insoluble residue can be isolated for a determination of peak molecular weight (or weight average molecular weight) by gel permeation chromatography or of supernatant for dextrose content (YSI method) and the results used as a measure of the degree of hydrolysis; both molecular weight (particularly $M_W$) and dextrose content have been found to correlate well with yield stress of the resulting starch hydrolysate upon fragmentation, as discussed below.

It has been found that there is very little, if any, change in the degree of branching of the glucan chains of the starch as a result of the acid hydrolysis. Thus, the ratio of 1,4 linkages to 1,6 linkages in the hydrolysate will generally be substantially the same as that of the starting amylopectin starch. Given the typical degree of branching of amylopectin and amylose, a starch comprised of a major proportion of amylopectin (i.e., greater than 50% by weight of the dry solids of the starch is glucan in the form of amylopectin) will exhibit a ratio of α-1,4 linkages to α-1,6 linkages of less than about 40:1. Thus, the starch hydrolysates will generally have a ratio of α-1,4 linkages to α-1,6 linkages of less than about 40:1, typically, from about 20:1 to about 40:1.

It has also been found that the crystalline form of the parent starch, as determined by X-ray diffraction, is retained without substantial change, although the relative crystallinity of the starch hydrolysate is generally greater than the parent starch. Thus, native waxy maize and native common corn starch (both of which are substantially free of the "B" type crystalline form) will generally yield hydrolysates that are substantially free of the "B" type as determined by X-ray diffraction.

The starch hydrolysis product of the slurry is isolated as the solid phase residue by separation thereof from the aqueous phase of the slurry. Techniques for such isolation include filtration (e.g. horizontal belt filtering), centrifugation (e.g. disk, decanter or solid bowl), sedimentation, and other suitable dewatering operations. It should also be noted that the efficiency of the separation of the insoluble starch hydrolysate residue from the aqueous liquid phase of the hydrolysate slurry and the degree of washing of the residue will affect the relative amounts of cold-water insoluble hydrolysate and cold-water soluble hydrolysate in the residue. However, it appears that the residue is relatively resistant to washing in the sense that relatively large amounts of cold-water solubles remain after washing (by simple reslurrying and recentrifugation at ambient temperatures). Thus, while the washing of the residue will affect the amount of cold-water soluble hydrolysate, conventional washing appears to have a surprisingly small effect.

The acid in the slurry can be neutralized either before or after isolation of the hydrolysate. However, it has been found particularly advantageous (in terms of obtaining a desirably bland flavor for the hydrolysate) to (i) only partially neutralize the slurry to a weakly acidic pH (e.g. from about 2.0 to about 3.5) and (ii) then hold the slurry at a moderately elevated temperature (e.g. 25° C. to 75° C.) for a short period of time (e.g. 15 minutes to 24 hours), prior to isolation, followed by washing and then neutralization of the solid hydrolysate residue to a substantially neutral pH (e.g. about 4.5 to about 5.0). This acid washing of the starch hydrolysate is particularly advantageous when employed in the context of microfiltration of the starch hydrolysate slurry using a ceramic microfiltration membrane contained within an acid resistant (e.g. polyvinyl chloride) housing.

It has been found that microfiltration is an effective means of separating an insoluble starch hydrolysate residue from an aqueous slurry thereof which also contains a relatively large amount of dissolved species, e.g. salt and saccharides. Microfiltration is described generally in D. R. Paul and C. Morel, "Membrane Technology", *Encyclopedia of Chemical Technology*, Vol. 15, pp. 92-131 (Kirk-Othmer, eds., John Wiley S Sons, Inc., New York, N.Y., 3d ed., 1981), the disclosure of which is incorporated herein by reference.

Typically, a liquid including small dissolved molecules is forced through a porous membrane. Large dissolved molecules, colloids and suspended solids that cannot pass through the pores are retained. Components retained by the membrane are collectively referred to as a concentrate or retentate. Components which traverse the membrane are referred to collectively as filtrate or permeate. Diafiltration is a microfiltration process in which the retentate is further purified or the permeable solids are extracted further by the addition of water to the retentate. This process is analogous to washing of a conventional filter cake. The use of microfiltration removes salts formed by the neutralization of the alkaline solution and other small molecular species.

Ultrafiltration is generally described and discussed by P. R. Klinkowski, "Ultrafiltration", *Encyclopedia of Chemical Technology*, Vol. 23, pp. 439-461 (Kirk-Othmer, eds., John Wiley & Sons, Inc., New York, N.Y., 3d ed., 1983), the disclosure of which is incorporated by reference herein. Ultrafiltration is a pressure-driven filtration on a molecular scale. The porous membrane typically has a pore size ranging from 0.005 to 20 micrometers (or microns). While a distinction is often made in the separation art between ultrafiltration (pore size range of 2 to 20 nanometers) and microfiltration (pore size greater than 20 nanometers), the terms will be used interchangeably herein unless expressly noted otherwise.

By "microporous ceramic membrane" is meant any ceramic layer (including "supported layer articles") having micropores and sufficient structural integrity to withstand the pressure needed to isolate the insoluble starch hydrolysate residue from the liquid phase of the aqueous slurry over a desired period of time (e.g. from 15 minutes to 24 hours). It is believed that the high pressure used to isolate the insoluble starch hydrolysate residue creates turbulent flow at the membrane's surface which prevents small particles in the slurry from "blinding off" the pores of the membrane (as has been observed with conventional filtration equipment as discussed below).

A typical microporous ceramic membrane is comprised of a microporous ceramic article having at least one macroscopic passage therethrough (typically a cylindrical article having cylindrical passages) substantially parallel to the axis of symmetry of the cylindrical article. While the article may be "microporous" itself, the ceramic cylinder may act principally as a support (i.e., in a "supported layer article") for a microporous layer (or layers with regard to multi-passage articles) which covers the surfaces defined by the passages through the ceramic article. The porosity of the ceramic article, and any microporous layer associated therewith as described above, can be varied as desired, with the pore size of any such layer being smaller than that of the article. In typical operation, such a ceramic filter element (i.e., cylindrical and microporous ceramic article) is contained in hollow cylindrical housing and slurry is fed into the passages under pressure through a feed manifold that prevents leakage into the housing. The exit of the isolated starch hydrolysate residue from the passages at the other end of the ceramic filter element is controlled by an exit manifold which also prevents leakage into the housing where the filtrate or permeate is contained. Ceramic filter elements and their use are described in "Solve Tough Process Filtration Problems with Ceraflo Ceramic Systems", a technical bulletin, Lit. No. SD113, 2/89 89-418, published (1989) by Millipore Corporation, Bedford, Mass., the disclosure of which is incorporated by reference.

The isolated starch hydrolysate is typically washed and then dried (e.g. to a low moisture content, typically 3–8%) after isolation to allow for handling and storage prior to further processing. Examples of drying techniques include spray drying, flash drying, tray drying, belt drying, and sonic drying. The dried hydrolysate may be hygroscopic, given the presence of the cold-water soluble hydrolysate therein. Thus, some rehydration during handling and storage may occur. Depending upon the precise composition of the hydrolysate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20%, or possibly greater than 15%), bulk handling problems and/or microbiological stability problems might arise.

A granular starch hydrolysate useful in the practice of this invention is commercially available from the A. E. Staley Manufacturing Company, Decatur, Illinois, as STELLAR TM fat replacer.

In certain embodiments, this invention relates to a dry granular starch hydrolysate composition consisting essentially of a major amount by weight of cold-water insoluble hydrolysate and a minor amount by weight of cold-water soluble hydrolysate, said dry, granular starch hydrolysate having (a) weight average molecular weight of from about 4,000 g/mol to about 7,500 g/mol, (b) a bland organoleptic character, and (c) an essentially dry moisture content.

It has been found that the granular starch hydrolysis process results in a granular starch hydrolysate composition that is particularly advantageous because of (i) the relative amounts of hydrolysate insolubles and hydrolysate solubles, (ii) weight average molecular weight, (iii) the bland organoleptic character of the granular starch hydrolysate, and (iv) edibility. This combination of properties is important to the use of the hydrolysate as a food ingredient, especially as a fat mimicking ingredient in foods. An essentially dry moisture content is important with respect to the edibility of the composition, e.g., the ability to handle and process the composition into a food product and the microbiological stability of the composition on storage thereof. The composition consists essentially of the major and minor amounts of hydrolysates of different solubility in the sense that it is essentially free of organic solvents and reaction products thereof with hydrolysate components (e.g. ethanol and ethyl glucosides).

In certain embodiments, this invention employs a composition of matter comprising (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of a cold-water soluble hydrolysate, and (ii) a minor amount of salt selected from the group consisting of alkali metal chlorides, alkali metal sulfates, alkaline earth metal chlorides, alkaline earth metal sulfates, and mixtures of two or more thereof, said salt being present in an amount sufficient to produce an organoleptically fat-like aqueous dispersion upon fragmentation of said composition in an essentially aqueous medium at about 20% dry solids of said starch hydrolysate. Typically, said salt is present in an amount of at least 0.1% basis dry weight of said granular starch hydrolysate, preferably at least about 1%, and more preferably about 1% to about 3%.

In certain embodiments, this invention employs a composition of matter comprising a major amount by weight of a granular starch hydrolysate having a weight average molecular weight of less than about 12,000 g/mol and being comprised of a controlled amount of salt present in an amount sufficient to enhance the fat-like characteristics of the composition upon shearing in an aqueous medium, said salt selected from the group consisting of alkali metal chlorides, alkali metal sulfates, alkaline earth metal chlorides, alkaline earth metal sulfates, and mixtures thereof.

In another aspect, this invention employs a composition of matter comprising (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of cold-water soluble hydrolysate, and (ii) a carbohydrate saccharide (in addition to said cold-water soluble hydrolysate) in an amount effective (e.g., a comparable amount by weight, see below) in relation to the amount of said fragmented granular starch hydrolysate and said water to enhance the fat-like properties of said dispersion following either freezing or heating to a temperature of about 72° C.

In another aspect, this invention employs an aqueous dispersion useful as a replacement for fats and/or oils comprising a major amount by weight of water and a minor amount by weight of a fragmented granular starch hydrolysate, said fragmented granular starch hydrolysate being (i) comprised of a major amount by weight of cold-water insoluble hydrolysate material and a minor amount by weight of cold-water soluble hydrolysate material and (ii) capable of imparting to said dispersion at about 20% solids a yield stress of from about 100 to about 1,500 pascals.

It is believed that the cold-water soluble hydrolysate material improves the water immobilization capability of such cold-water insoluble hydrolysate material, as compared to aqueous dispersion containing only cold-water insoluble material at the same level of cold-water insoluble material solids. In general, the "minor amount" will be a significant amount in terms of its effect on the properties of the composition, e.g., the ratio of cold-water insoluble to cold-water soluble will be no greater than about 9:1, typically less than about 5:1, and preferably from about 3.0:1 to about 4.0:1.

The fragmented starch hydrolysate may also be otherwise chemically modified. Examples of such chemical modification include the product of reaction with bleaching agents (e.g. hydrogen peroxide, peracetic acid, ammonium persulfate, chlorine (e.g. calcium and-/or sodium hypochlorite or sodium chlorite), and permanganate (e.g. potassium permanganate); esterifying agents (e.g. acetic anhydride, adipic anhydride, octenyl succinic anhydrides, succinic anhydride, vinyl acetate); including phosphorous compounds (e.g, monosodium orthophosphate, phosphorous oxychloride, sodium tripolyphosphate, and sodium trimetaphosphate); and/or etherifying agents (e.g. acrolein, epichlorohydrin, and-/or propylene oxide). Such chemical modifications will typically be accomplished after the acid hydrolysis step, but may be accomplished prior to the acid hydrolysis or effected by using a modified starch as a starting material for the acid hydrolysis step. Even esterified starches (e.g. starch modified with octenyl succinic anhydride) can be used as a starting material and significant ester functionality will be retained, as demonstrated by example below.

Following acid-hydrolysis (and neutralization of the slurry), the granular starch hydrolysate is subjected to a physical fragmentation as by mechanical disintegration, i.e. fragmented. As used herein, "fragmented" means that a majority of the starch granules have been so fragmented that they no longer exhibit, under microscopic examination, the macro-organization of the granule, e.g., the shape characteristic of that variety of granule. Generally, the concentric shells of material that are observed in the granule after the hydrolysis are not observed in a majority of the granules after fragmentation. However, the native crystallites present in the granule are retained (as confirmed by X-ray diffraction of the salves).

The mechanical disintegration of the hydrolysate may be carried out in several ways, as by subjecting it to attrition in a mill, or to a high speed shearing action, or to the action of high pressures. Disintegration is generally carried out in the presence of a major amount by weight of a liquid medium, preferably water. Although tap water is the preferred liquid medium for the dispersion of fragmented starch hydrolysate, other liquids are suitable provided sufficient water is present to hydrate the fragmented starch hydrolysate and, thus, result in a dispersion having a suitable yield stress. Sugar solutions, polyols, of which glycerol is an example, alcohols, particularly ethanol, isopropanol, and the like, are good examples of suitable liquids that can be in admixture with water in the liquid medium. It may also be convenient to fragment the starch hydrolysate in a nonhydrating medium (e.g. 95% ethanol), then solvent exchange with water, and finally redisperse the fragmented starch hydrolysate to form an aqueous dispersion. Typically, however, the starch hydrolysate will be physically fragmented in potable water. Thus, this invention relates to a method of making an aqueous dispersion useful as a replacement for fats and/or oils comprising physically fragmenting a minor amount by weight of an amylopectin starch hydrolysate in the presence of a major amount by weight of a liquid consisting essentially of water, said physically fragmenting being effective to yield an aqueous dispersion having a yield stress of from about 100 pascals to about 1,500 pascals.

The mechanical disintegration is preferably accomplished by subjecting an aqueous dispersion of the hydrolysate to high shear, e.g., in a Waring blender or a homogenizer such as that disclosed in U.S. Pat. No. 4,533,254 (Cook et al.) and commercially available as a "MICROFLUIDIZER" from Microfluidics Corporation, Newton, Mass., or a homogenizer such as the RANNIE ™ high pressure laboratory homogenizer, Model Mini-lab, type 8.30 H, APV Rannie, Minneapolis, Minn. Other suitable homogenizers include the model M3-10TBS from APV Gaulin, Arlington Heights, Ill. In general, the performance of homogenizers of the colloid mill type is improved by using a relatively low flowrate with backpressure with temperature at 55°–65° C. Other suitable devices, which provide mechanical shear, include continuous mixers, e.g. model 4M1H15A, from E. T. Oakes Corp, Islip, N.Y., and batch mixers, e.g. Breddo Likiwifier model LORWWSS-200, from American Ingredients, Kansas City, Mo.

The temperature of the starch hydrolysate must be maintained below the gelatinization (i.e. solubilization) temperature of the hydrolysate. Thus, it may be necessary to cool the hydrolysate during disintegration. For example, when shearing starch hydrolysate derived from waxy maize starch, the temperature of the aqueous dispersion is typically maintained between about 55° C. and about 65° C. Whatever method is used, the disintegration is carried out to such an extent that the resulting finely-divided product is characterized by its ability to form a salve-like suspension in the liquid medium in which it is attrited or in which it is subsequently dispersed. By a salve-like suspension or dispersion is meant one which will exhibit, at about 20% hydrolysate solids, a yield stress of at least about 100 pascals, typically from about 100 pascals to about 2,000 pascals.

It should be noted that it has been found that an aqueous dispersion of the hydrolysate generally exhibits an increase in viscosity over a period of hours following the mechanical disintegration. Thus, the yield stress values herein denote the yield stress about three hours after mechanical disintegration unless otherwise noted. It should also be noted that mechanical disintegration may be sufficient to produce an aqueous dispersion having the desired yield stress, but still leave a sufficient number of particles of sufficient size to exhibit a "particulate" or "chalky" mouthfeel when ingested. Such chalkiness can be reduced by reducing the particle size of the starch hydrolysate before, during or after mechanical disintegration so that substantially all (typically at least about 95%, preferably at least 99%) of the hydrolysate will pass a U.S. #400 mesh sieve (i.e., substantially all particles are less than 15 microns). An example of a milling device suitable for such size reduction is a TROST ™ Air Impact Mill from Gatlock, Inc., Newton, Pa.

It has further been found that the use of a homogenizer as disclosed in U.S. Pat. No. 4,533,254 is facilitated by the addition of a small amount (e.g. 5% by weight of the starch hydrolysate dry solids) of an emulsifier to the aqueous slurry of starch hydrolysate fed to the homogenizer. When relatively high solids slurries of starch hydrolysate are fed into the homogenizer without added emulsifier, the homogenizer tends to plug after extended operation. The addition of emulsifier (for example, a mixture of mono- and all-fatty acid glycerides, e.g. DUR-LO ™ emulsifier from Van den Bergh Foods) prevents this plugging of the homogenizer. Other emulsifiers include polyglycerol esters, polysorbates, ethoxylated monoglycerides, sorbitan monostearate, lactylated esters, and lecithin. Homogenizers useful in forming suspensions or emulsions are described generally by H. Reuter, "Homogenization", *Encyclopedia of Food Science*, pp. 374–376, (M. S. Peterson and A. H. Johnson, eds., AVI Publ. Co., Westport, Conn., 1978), L. H. Rees and W. D. Pandolfe, "Homogenizers", *Encyclopedia of Food Engineering*, pp. 467–472 (C. W. Hall, et al., eds., AVI Publ. Co., Westport, Conn., 1986), and W. C. Griffin, "Emulsions", *Encyclopedia of Chemical Technology*, Vol. 8, pp. 900–930 (Kirk-Othmer eds., John Wiley & Sons, Inc., New York, N.Y., 3d ed., 1979), the disclosures of which are incorporated herein by reference.

This detailed description will now turn to a description of the debranched starch hydrolysate. The fragmented, debranched starch precipitate is made by the sequential steps of debranching, precipitation, and fragmentation of a starch material containing amylopectin. Starch is generally comprised of a highly-branched glucan having $\alpha$-1,4 and $\alpha$-1,6 linkages, denominated amylopectin, and a substantially linear glucan, having almost exclusively $\alpha$-1,4 linkages, denominated amylose. Methods of determining the amounts of each are referenced in R. L. Whistler, et al., *Starch: Chemistry and Technology*, pp. 25–35 (Academic Press, Inc., New York, N.Y., 1984), the disclosure of which is incorporated by reference. Starches having a major proportion (i.e. at least 50% by weight) of amylopectin are preferred and examples of these include the common non-mutant starches of cereals, tubers and legumes, e.g. corn, wheat, rice, potato and tapioca, pea and mutant varieties comprised of a major proportion of amylopectin, e.g. waxy maize. Common corn starch and waxy maize starch, both of which are examples of starches containing less than 40% amylose, are useful herein. However, starches containing a major amount of amylose (e.g. 50% to 75% by weight) are also useful and may be preferred depending upon the precise properties desired in the final product. Examples of such starches from high amylose corn include HI-SET ® C and HY-LON ™ (each about 55% amylose by weight) and HYLON ™ VII (about 70% amylose by weight), all available from National Starch and Chemical Corporation, Bridgewater, N.J.

In certain embodiments, the starch consists essentially of amylopectin. In such embodiments, the starch employed is from a mutant variety of native starch which consists essentially of amylopectin or is amylopectin derived from a native starch variety containing both amylose and amylopectin. Methods for the fractionation of amylose and amylopectin from native starch are disclosed in, for example, U.S. Pat. No. 3,067,067 (Etheridge).

If the starch chosen as a starting material is not in pre-gelatinized or instant form, the starch must be gelatinized or pasted prior to debranching. The gelatinization or pasting process disrupts, at least in substantial part, the associative bonding of the starch molecules in the starch granule. This permits the enzyme to access to the molecule to more easily and uniformly debranch the amylopectin molecules. This disruption is accomplished by heating a slurry of the starch to a sufficient temperature for a sufficient length of time depending upon the inherent resistance of the particular starch to gelatinization and the amount of moisture present in the slurry. The slurry will typically be comprised of a major amount of water (i.e. at least 50% by weight) and a minor amount of the starch starting material (i.e. less than about 50% by weight). Preferably, the starch slurry will contain at least about 5% starch, typically between about 10% to about 25% starch. The pH of the slurry will generally be substantially neutral, i.e. from about 3.5 to about 9 and more preferably from about 6 to 8, to minimize hydrolysis of the starch molecules. The time, temperature, slurry solids and pH should be optimized to gelatinize the starch, yet minimize hydrolysis of the starch.

The appropriate temperature, pressure and period of treatment needed to provide a starch paste is preferably obtained by processing aqueous starch slurries in equipment commonly known in the art as steam injection heaters or jet cookers. In such equipment, superatmospheric steam is injected and mixed with a water slurry of starch in a throat section of a jet. Upon contact with the injected steam, the starch granules are uniformly and thermally treated under turbulent conditions whereupon the starch granules are gelatinized and solubilized. Examples of steam injection heaters wherein the temperature, pressure and feed rate can be regulated to provide the desired starch pastes are disclosed in U.S. Pat. Nos. 3,197,337; 3,219,483; and 3,133,836. More uniformly solubilized starch pastes are obtained by use of the steam injection heater in combination with a holding zone such as coiled tubing or a pressurized tank constructed to minimize liquid channeling. Other pasting equipment, e.g. heat exchangers, homogenizers, cookers, rotators, sizeometer cookers, kettle cookers, etc., may be employed provided the pasting conditions can be adequately maintained.

The gelatinized starch is then treated with a debranching enzyme, i.e. an enzyme capable of hydrolyzing the 1,6-glucosidic bond of amylopectin without significant capability of hydrolyzing the 1,4-glucosidic bond. Enzymes from a variety of sources are capable of debranching amylopectin. U.S. Pat. No. 3,730,840 (Sugimoto, et al.) describes sources of debranching enzymes, the disclosure of which is incorporated herein by reference. Examples of useful enzymes include pullulanases derived from bacteria of the genus Aerobacter (e.g. E.C. 3.2.1.41 pullulan 6-glucanohydrolase) and isoamylases derived from bacteria of the genus Pseudomonas (e.g. E.C. 3.2.1.68 glycogen 6-glucanohydrolase). Particularly useful enzymes include thermostable enzymes, e.g. thermostable pullulanases as disclosed in PCT Publ. No. WO 92/02614, published Feb. 20, 1992, the disclosure of which is incorporated by reference, and which are obtained from members of the genus Pyrococcus. The debranching enzyme may be in solution during debranching or it may be immobilized on a solid support.

The debranching enzyme preparation should be as specific as possible for the hydrolysis of the 1,6-glucosidic bond of amylopectin and amylose. Thus, the enzyme preparation, if it contains a mixture of enzymes, is preferably essentially free of enzymes capable of hydrolyzing α-1,4-glucosidic bonds. Minimizing hydrolysis of α-1,4-glucosidic bonds will help to minimize the amounts of dextrose and soluble oligomers produced during debranching. Because these soluble saccharides are not believed to contribute to the functionality of the debranched material, minimizing their production will enhance the yield of functional material.

The debranching enzyme is allowed to act upon the solubilized starch containing amylopectin. The optimum concentration of enzyme and substrate in the debranching medium will, in general, depend upon the level of activity of the enzyme which, in turn, will vary depending upon the enzyme source, enzyme supplier and the concentration of the enzyme in commercial batches. When the isoamylase E.C. 3.2.1.68, derived from Pseudomonas amyloderamosa, available from Sigma Chemical Company, St. Louis, Mo., is employed, typical conditions include the treatment of a starch solution at 5% to 30% by weight starch solids with about 50 units of enzyme per gram of starch for a period of about 48 hours to obtain substantially complete debranching.

The optimum pH and temperature of the debranching medium will also depend upon the choice of enzyme. The debranching medium may, in addition to the water used to solubilize the starch, contain buffers to ensure that the pH will be maintained at an optimum level throughout the debranching. Examples of useful buffers include acetates, citrates, and the salts of other weak acids. With the isoamylase described above, the pH is preferably maintained at about 4.0 to 5.0 and the temperature from about 40° C. to about 50° C. With the thermostable pullulanase described above, the pH is preferably maintained between 5 and 7 and the optimum temperature should be between 85° C. and 115° C.

The debranching is allowed to proceed until the desired degree of debranching has been obtained. The precise degree of debranching needed to obtain the desired particle gel of the debranched amylopectin starch may vary depending upon the source of the starch and the precise properties desired in the resulting gel. Preferably, the degree of debranching is sufficient to convert more than about 80% of the amylopectin in the starch to short chain amylose and, more preferably, at least about 90% of the amylopectin. In preferred embodiments, essentially all of the amylopectin is converted to short chain amylose. The amount of short chain amylose can be measured by gel permeation chromatography as set forth in U.S. Pat. No. 4,971,723, wherein short chain amylose is calculated from the relative area of the peak obtained within the molecular weight range of 500 to 20,000. Thus, preferably less than 20% of the amylopectin that was originally present will be present as molecular species having a molecular weight in excess of 20,000 g/mol, and most preferably, essentially no amylopectin having a molecular weight in excess of 20,000 g/mol will remain. (It should be noted that if amylose is present, at least a portion thereof may be debranched to produce molecules above the 20,000 g/mol cut-off and molecules below the 20,000 g/mol cut-off. To measure how much of the material eluting between 500 g/mol and 20,000 g/mol is debranched amylopectin and how much is debranched amylose, it may be necessary to fractionate the starting starch into its amylose and amylopectin fractions and then debranch and elute each fraction separately.)

It has been found, as described more fully below, that when waxy maize starch was debranched, precipitated and then fragmented, a degree of debranching of only about 57% resulted in an aqueous dispersion that displayed the rheological characteristics of a polymer gel. However, when the debranching was allowed to proceed to 69% and 85%, an aqueous dispersion of the fragmented precipitate displayed rheological properties characteristic of a particle gel. When the degree of debranching was substantially 100%, the fragmented precipitate displayed rheological properties even more closely resembling a particle gel, and in fact, which bore a remarkable resemblance to a commercially available plastic fat, i.e. CRISCO brand shortening, a product of Procter and Gamble, Cincinnati, Ohio.

After the desired degree of debranching is obtained, debranching enzyme in solution is deactivated, e.g. by heating to denature the enzyme. If an immobilized enzyme is employed, the contact time of the solubilized starch is adjusted so that the starch is removed from the enzyme when the desired degree of debranching is obtained. The debranching medium may be concentrated by removal of water therefrom, e.g. by evaporation, to facilitate precipitation. The debranching medium may also be treated to remove impurities therefrom. Treatment with, for example, activated carbon will remove residual proteins and lipids that may contribute to off-flavors and/or colors.

The solution of debranched starch is then allowed to form a precipitate. Generally, the solution will be cooled, e.g. to ambient temperature, to reduce the solubility of the debranched starch therein. The solution will typically be allowed to stand until substantial equilibrium is achieved between the supernatant and the precipitate. The precipitate can be isolated from the supernatant, e.g. by centrifugation, prior to fragmentation, but isolation from the supernatant is not necessary to form a useful product.

Heating (e.g. to about 70° C.) of the precipitate while in contact with a liquid medium e.g. the supernatant from original precipitation and/or fresh water following isolation of the precipitate From the supernatant) to dissolve at least a portion of the precipitate and then reprecipitation by cooling of the suspension/solution can also be employed. This reprecipitation tends to make the precipitate resistant to melting or dissolving when an aqueous dispersion of the fragmented precipitate is exposed to heat, e.g. in a pasteurization step. In general, the higher the temperature to which the precipitate in the liquid medium is heated (and thus the greater the amount of precipitate that is redissolved), the higher the temperature at which the resulting aqueous dispersion of fragmented precipitate will be stable. Repetition of the dissolving and reprecipitation also tends to improve the temperature stability of the resulting aqueous dispersion.

It is also advantageous to heat the precipitate to redissolve a substantial portion of the low melting polysaccharides and then treat the heated suspension of precipitate with acid or enzyme to hydrolyze soluble polysaccharides in the solution. (It may also be advantageous to filter the slurry while hot to remove soluble polysaccharides or their hydrolysates.) The dissolving and re-precipitation steps alone improve the stability of the aqueous dispersion by increasing the amount of the fragmented precipitate which remains as insoluble fragments in an aqueous dispersion that is exposed to heat. Further, a slow rate of heating and/or cooling (e.g. from about 0.005° C./min. to about 0.5° C./min. for each) may be advantageous. However, the remaining soluble fraction of the precipitate can associate to form relatively large particles that are present in the precipitate after fragmentation and that can contribute a "chalky" or "gritty" texture to the dispersion. Treatment of the heated suspension/solution of the precipitate with acid or enzyme to hydrolyze a substantial portion of the soluble fraction can reduce or eliminate such large particles. Typical treatment conditions will involve mild hydrolysis catalyzed by acid, e.g. in a solution of 0.1N HCl for one hour, or, preferably, by enzyme, e.g. α-amylase.

The isolated debranched amylopectin starch precipitate is typically washed and then dried (e.g. to a low moisture content, typically 3–8%) after isolation to allow for handling and storage prior to further processing. Examples of drying techniques include spray drying, flash drying, tray drying, belt drying, and sonic drying. The dried precipitate may be hygroscopic. Thus, some rehydration during handling and storage may occur. Depending upon the precise composition of the precipitate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20%, or possibly greater than 15%), bulk handling problems and/or microbiological stability problems might arise.

The debranched amylopectin starch precipitate may also be otherwise chemically modified. Examples of such chemical modification include the product of reaction with bleaching agents (e.g. hydrogen peroxide, peracetic acid, ammonium persulfate, chlorine (e.g. calcium and/or sodium hypochlorite or sodium chlorite), and permanganate (e.g. potassium permanganate)); esterifying agents (e.g. acetic anhydride, adipic anhydride, octenyl succinic anhydrides, succinic anhydride, vinyl acetate); including phosphorous compounds (e.g. monosodium orthophosphate, phosphorous oxychloride, sodium tripolyphosphate, and sodium trimetaphosphate); and/or etherifying agents (e.g. acrolein, epichlorohydrin, and/or propylene oxide). Such chemical modifications will typically be accomplished after the debranching step, but may be accomplished prior to the debranching or effected by using a modified starch as a starting material for the debranching step, provided such modification does not preclude debranching.

The debranched amylopectin starch precipitate is subjected to a physical fragmentation as by mechanical disintegration, i.e. fragmented. The degree of fragmentation will be sufficient to allow the precipitate to form a particle gel in an aqueous medium. Certain steps can be taken prior to fragmentation to enhance the susceptibility of the precipitate to fragmentation. For example, the addition to the solution of additives which will introduce imperfections into the crystalline structure of the precipitate, e.g. higher saccharides such as maltodextrins, may make the precipitate easier to fragment to the desired degree. Subjecting a slurry of the precipitate to mild hydrolysis catalyzed by acid, e.g. in a solution of 0.1N HCl for one hour, or, preferably, by enzyme, e.g. α-amylase, may also make fragmentation easier.

The mechanical disintegration of the precipitate may be carried out in several ways, as by subjecting it to attrition in a mill, or to a high speed shearing action, or to the action of high pressures. Disintegration is generally carried out in the presence of a major amount by weight of a liquid medium, preferably water. Although tap water is the preferred liquid medium for the dispersion of fragmented starch precipitate, other liquids are suitable provided sufficient water is present to hydrate the fragmented starch precipitate and, thus, result in a dispersion having the characteristics of a particle gel. Sugar solutions, polyols, of which glycerol is an example, alcohols, particularly ethanol, isopropanol, and the like, are good examples of suitable liquids that can be in admixture with water in the liquid medium. It may also be possible to fragment the starch precipitate in a non-hydrating medium (e.g. 95% ethanol), then solvent exchange with water, and finally redisperse the fragmented starch precipitate to form an aqueous dispersion. Typically, however, the starch precipitate will be physically fragmented in potable water.

The mechanical disintegration is preferably accomplished by subjecting an aqueous dispersion of the precipitate to high shear, e.g. in a Waring blender or a homogenizer such as that disclosed in U.S. Pat. No. 4,533,254 (Cook, et al.) and commercially available as a MICROFLUIDIZER ™ from Microfluidics Corporation, Newton, Mass., or a homogenizer such as the RANNIE ™ high pressure laboratory homogenizer, Model Mini-lab, type 8.30 H, APV Rannie, Minneapolis, Minn. Homogenizers useful in forming suspensions or emulsions are described generally by H. Reuter, "Homogenization", *Encyclopedia of Food Science*, pp. 374–376 (M. S. Peterson and A. H. Johnson, eds., AVI Publ. Co., Westport, Conn., 1978), L. H. Rees and W. D. Pandolfe, "Homogenizers", *Encyclopedia of Food Engineering*, pp. 467–472 (C. W. Hall, et al., eds., AVI Publ. Co., Westport, Conn., 1986), and W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosures of which are incorporated herein by reference.

The temperature of the starch precipitate during the fragmentation step should be maintained below the temperature at which a major portion of the precipitate will dissolve in the aqueous medium. Thus, it may be desirable to cool the precipitate during disintegration. Alternatively, heat produced during fragmentation may cause the precipitate to dissolve, but cooling may cause the dissolved precipitate to reprecipitate and form a useful product. Whatever method is used, the disintegration is carried out to such an extent that the resulting finely-divided product is characterized by its ability to form a particle gel in the liquid medium in which it is attrited or in which it is subsequently dispersed.

The debranched amylopectin starch particles which make up the particle gel can be analyzed in a variety of ways. Rheological measurements can be made to determine the rheological characteristics of the resulting dispersion. Typically, the aqueous dispersion of debranched amylopectin starch particles will exhibit a transition in dynamic elastic modulus (G') versus shear strain at less than about 50 millistrain, and preferably less than about 10 millistrain, said transition being from a substantially constant G' versus shear strain to a decreasing G' versus shear strain. The transition indicates fracture of the particle network within the particle gel and is typically a sharp transition.

Analysis of the debranched amylopectin starch particles formed after dissolution shows that the starch has a measurable crystallinity. The crystalline regions of particles derived from fully debranched waxy maize starch (essentially no amylose component) exhibit a diffraction pattern characteristic of a starch material consisting essentially of A-type starch crystals. The crystalline regions of particles derived from substantially fully debranched common corn starch (about 28% amylose) exhibit a diffraction pattern characteristic of a starch material consisting essentially of B-type starch crystals.

It should also be noted that mechanical disintegration may be sufficient to produce an aqueous dispersion having the desired particle gel characteristics, but still leave a sufficient number of particles of sufficient size to exhibit a "particulate" or "chalky" mouthfeel when ingested. Such chalkiness can be reduced by the mild hydrolysis discussed above or by reducing the particle size of the starch precipitate before, during or after mechanical disintegration so that substantially all (typically at least about 95%, preferably at least 99%) of the precipitate will pass a U.S. #325 mesh sieve (i.e. substantially all particles are less than 45 microns). An example of a milling device suitable for such size reduction is a TROST ™ Air Impact Mill from Gatlock, Inc., Newton, Pa.

It should be mentioned that methods of preparing and using particular fragmented granular starch hydrolysates are described in PCT Publication No. WO 91/12728, published Sep. 5, 1991, U.S. Ser. No. 07/746,432, filed Aug. 16, 1991, now abandoned, and 07/918,952, filed Jul. 30, 1992, the disclosures of which are incorporated herein by reference, and that methods of preparing and using particular debranched starch hydrolysates are described in U.S. Ser. No. 07/746,381, now abandoned, filed Aug. 16, 1991, and Ser. No. 07/918,862, filed Jul. 30, 1992, the disclosures of which are incorporated herein by reference.

This detailed description will now turn to the manufacture of the dry blend of fragmented starch hydrolysate and hydrophilic agent. It is contemplated that commercial production and use will involve hydrolysis (either acid-hydrolysis in the case of a granular starch hydrolysate or debranching in the case of a debranched starch hydrolysate), mechanical disintegration (i.e. fragmenting), blending (after said fragmenting and while the fragments are still wet) with the hydrophilic agent and then drying (e.g. spray drying) of the aqueous blend of fragmented starch hydrolysate to produce an item of commerce. This item of commerce will then be purchased by a food processor for use as an ingredient. To rehydrate the dried blend of fragmented starch hydrolysate and hydrophilic agent, and/or incorporate the blend into a food product, it may be useful and/or necessary to expose the mixture to some shear force. However, the techniques employed for such rehydration and/or mixing with other food ingredients, the shear forces will not need to be nearly as vigorous as the shear force employed to accomplish the original mechanical disintegration prior to drying of the blend of wet, fragmented starch hydrolysate and hydrophilic agent.

The first step in preparing a dry blend comprises preparing a mixture of a minor amount of a hydrophilic agent with a major amount of a fragmented starch hydrolysate in an aqueous environment to form a wet blend thereof. To establish the aqueous nature of environment of the mixture, the wet blend will generally comprise a major proportion by weight of water and a minor proportion by weight of solids (e.g. 10–30% dry solids by weight) from the fragmented starch hydrolysate and the hydrophilic agent. While not wishing to be bound by any particular theory unless expressly indicated otherwise, it is thought that there must be sufficient water to maintain the hydration of the surface of the fragments of starch hydrolysate, to dissolve the hydrophilic agent, and to distribute the hydrophilic agent on the surface of the fragments to a degree which will prevent an association between the fragments which inhibits the redispersibility of the fragments.

The process of wet blending will typically entail fragmentation of the starch hydrolysate in water followed by addition of the hydrophilic agent to the aqueous dispersion of fragmented starch hydrolysate. However, the starch hydrolysate and hydrophilic agent can be dry blended prior to fragmentation or the hydrophilic agent can be dissolved in the water in which the starch hydrolysate will be fragmented. To reduce the energy needed to dry the wet blend, a portion of the water can be removed from the blend prior to drying, e.g. by reverse osmosis or (depending on the molecular size of the hydrophilic agent) ultrafiltration.

After wet blending, the next step comprises drying said wet blend at a temperature low enough to prevent the dissolution of a major proportion by weight of said fragmented starch hydrolysate in the water of said aqueous environment. If the fragmented starch hydrolysate is relatively more thermally stable, e.g it contains a major amount of amylose or is derived from a starch which did, then the selection of drying conditions to avoid such dissolution will be made simpler. In other words, the ability of the fragmented starch hydrolysate to withstand higher temperatures make a wide variety of conditions useful for drying. However, if a relatively less thermally stable fragmented starch hydrolysate is employed, it may be necessary to carefully adjust and control the drying conditions to keep the temperature of the starch hydrolysate fragments from dissolving in the water prior to its removal. Examples of drying techniques which should be useful include spray drying, flash drying, tray drying, belt drying, and sonic drying. In general, mild drying techniques such as spray drying or flash drying, wherein there is a short retention time, and sufficient air flow around the fragments to promote evaporative cooling thereof, will be most generally useful.

The blend of fragmented starch hydrolysate and hydrophilic agent is typically dried to a low moisture content, typically 3–8%, after blending to allow for handling and storage prior to further processing. The dried blend may be hygroscopic. Thus, some rehydration during handling and storage may occur. Depending upon the precise composition of the precipitate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20%, or possibly greater than 15%), bulk handling problems and/or microbiological stability problems might arise.

The hydrophilic agent can be one or more of a variety of materials that meet certain requirements. Of course, the most important requirement is that it improves the redispersibility of the fragmented starch hydrolysate, even though it is present in a minor amount. However, it must perform this function, without interfering in the formation of a particle gel. Thus, the hydrophilic agent must be non-gelling, at least at the concentration at which it is employed and under the conditions (e.g. the presence of crosslinking additives) to which the particle gel will be exposed. As discussed above, it is believed that the hydrophilic agent must be sufficiently dispersible in water, if not at least sufficiently soluble in water, to effectively disperse the agent on the surface of the fragments of the starch hydrolysate. Of course, if the blend will be used in food, the hydrophilic agent should be edible by humans.

The hydrophilic agent should not be a starch or a hydrolysate thereof. It has been found that gelatinized, unmodified waxy maize starch was not effective as the hydrophilic agent. While not wishing to be bound by any particular theory unless expressly indicated otherwise, it is thought that the similarity of the waxy maize starch to the fragmented starch hydrolysate allows for too great an affinity between the starch and the fragments upon drying such that the fragments are not allowed to redisperse and rehydrate.

Examples of suitable hydrophilic agents include hydrophilic polymers, including conventional polysaccharide gums, e.g. xanthan gum, locust bean gum, and guar gum, as well as synthetic gums such as water-soluble salts of carboxyalkyl cellulose (e.g. carboxymethyl cellulose), alkyl celluloses (e.g. methyl cellulose, ethyl cellulose, methyl ethyl cellulose, etc.), hydroxyalkyl celluloses (e.g. hydroxyethyl cellulose, hydroxypropyl cellulose, etc.) and mixed hydroxyalkyl alkyl celluloses (e.g. hydroxypropyl methyl cellulose) and polyoxyalkylenes (e.g. polyethoxylates such as polyethylene glycols having a molecular weight between 200 and 9,500) can also be used. Hydrophilic polymers are discussed in more detail in J. BeMiller, "Gums", *Encyclopedia of Food Science and Technology*, Vol. 2, pp. 1338–1343 (John Wiley s Sons, Inc., New York, N.Y., 1992) and A. Teot, "Resins, Water-Soluble", *Encyclopedia of Chemical Technology*, Vol. 20, pp. 207–230 (Kirk-Othmer, eds., John Wiley s Sons, Inc., New York, N.Y., 1982, 2d ed.), the disclosures of which are incorporated herein by reference.

The amount of hydrophilic polymer in the dry blend will be minor in comparison to the fragmented starch hydrolysate (e.g. 1% to 10% by weight of the total dry solids of the dry blend) and will be effective to improve the redispersibility of said fragmented starch hydrolysate when a minor amount of said blend is dispersed in a major amount of water, without destroying the particle gel character of the resulting dispersion. Because the dry blend is, in turn, a minor proportion of the weight of the useful aqueous dispersions thereof, the hydrophilic polymer will be present in the aqueous redispersion in only nominal amounts, e.g. typically less than 3% by weight of the redispersion, more typically less than 1% by weight of the redispersion, and most typically from about 0.1% to 0.8%.

The hydrophilic agent may be an alkane polyol. Such compounds have a hydrocarbon backbone to which hydroxyl groups are covalently bonded. They are typically of low molecular weight (e.g. less than about 200 g/mol) and are humectant in nature (which is believed to be a major contributor to its effectiveness herein), but must be relatively non-volatile under the drying conditions chosen for drying of the wet blend (i.e. sufficiently non-volatile to retain an effective amount of the alkane polyol in the dried blend). Like the hydrophilic polymer, it should be water dispersible if not water soluble. Examples of alkane polyols include the simple alkane polyols such as glycerol, propylene glycol, pentaerythritol, and the like, and the hydrogenated sugars such as sorbitol, mannitol, xylitol, erythritol, threotol, and the like.

The amount of alkane polyol in the dry blend will be minor in comparison to the fragmented starch hydrolysate (e.g. 5% to 35% by weight of the total dry solids of the dry blend), although the amount is typically greater than the amount of hydrophilic polymer and, of course, will be effective to improve the redispersibility of said fragmented starch hydrolysate when a minor amount of said blend is dispersed in a major amount of water. Because the dry blend is, in turn, a minor proportion of the weight of the useful aqueous dispersions thereof, the alkane polyol will be present in the aqueous redispersion in only nominal amounts, e.g. typically less than 10% by weight of the redispersion, more typically less than 3% by weight of the redispersion, and most typically from about 0.5% to 1.5%.

The hydrophilic agent may be a surfactant. By surfactant is meant a compound having a hydrophile lipophile balance, but having nonetheless sufficient hydrophilic character to improve the redispersibility of the fragmented starch hydrolysate, even though the surfactant is present in a minor amount (e.g. 0.05% to 2% by weight d.s.b. of the dry blend). The hydrophile lipophile balance will typically be at least about 6, e.g. from about 7–15, and more typically from about 8–15. Examples of useful surfactants include polyethoxylated fatty alcohols, ethoxylated mono- and di-glycerides, ethoxylated sorbitan fatty acid esters, polyglycerol fatty acid esters, and the like.

This detailed description will now turn to the use of the blend containing a fragmented starch hydrolysate and a hydrophilic agent in foods and the use of the blends to replace fats and/or oils in foods. The terms "foodstuff" and "food", as used herein, are intended to broadly cover nutritional and/or functional materials that are ingested by humans in the course of consuming edible fare. The term "fats and/or oils" is intended to broadly cover edible lipids in general, specifically the fatty triglycerides commonly found in foods. The terms thus include solid fats, plastic shortenings, fluid oils, and the like. Common fatty triglycerides include cottonseed oil, soybean oil, corn oil, peanut oil, canola oil, sesame oil, palm oil, palm kernel oil, menhaden oil, whale oil, lard, and tallow. The technology of fats and/or oils is described generally by T. H. Applewhite, "Fats and Fatty Oils", *Encyclopedia of Chemical Technology*, Vol. 9, pp. 795–831 (Kirk-Othmer, eds., John Wiley & Sons, Inc., New York, N.Y., 3d ed., 1980), the disclosure of which is incorporated by reference.

The use of the fragmented starch hydrolysate allows for the replacement of a substantial portion (e.g. from 10% to 100% by weight) of the fat and/or oil in a food formulation. The precise level of replacement that is possible without significantly decreasing the organoleptic quality of the food will generally vary with the type of food. For example, in a French-style salad dressing, it is generally possible to completely replace the oil component that is normally present. In other types of foods, e.g. frostings, icings, cream fillings, ice cream, margarine, etc., a major amount of the fat and/or oil (e.g.

about 50% to about 80%) can be replaced with little effect on the organoleptic desirability of the food. Examples of typical foods in which fat and/or oil can be replaced include frostings (e.g. icings, glazes, etc.), creme fillings, frozen desserts (e.g. ice milk, sherbets, etc.), dressings (e.g. pourable or spoonable salad and/or sandwich dressings), meat products (e.g. sausages, processed meats, etc.), cheese products (e.g. cheese spreads, processed cheese foods), margarine, fruit butters, other imitation dairy products, puddings (e.g. mousse desserts), candy (e.g. chocolates, nougats, etc.), and sauces, toppings, syrups and so on.

Generally, it will be desirable to remove sufficient fat from a given food formulation to achieve a reduction in calories of at least one-third per customary serving or make a label claim of "cholesterol-free". (In this regard, see, for example, the list of standard serving sizes for various foods published in Food Labelling; Serving Sizes, 55 Fed. Reg. 29517 (1990) (to be codified at 21 C.F.R. 101.12), the disclosure of which is incorporated herein by reference, and the restrictions on labelling "cholesterol-free" at Food Labelling; Definitions of the Terms Cholesterol Free, Low Cholesterol and Reduced Cholesterol, 55 Fed. Reg. 29456 (1990)). It should also be noted that the fat removed from a particular formulation may be replaced with an equal amount by weight of an aqueous dispersion of fragmented starch hydrolysate, but that such equality may not be necessary or desirable in all instances. Further, it may be desirable to remove fat and add another ingredient (e.g. a gum, polydextrose, a protein, etc.) along with the aqueous dispersion of starch hydrolysate.

While this invention is generally directed to the replacement of fat and/or oil in a food formulation, it is of course within the contemplation of this invention that a fragmented granular amylopectin starch hydrolysate will be used in an entirely new formulation to which it contributes fat-like organoleptic qualities but is not, in the strictest sense, replacing a pre-existing fat or oil ingredient. Moreover, it is contemplated that the fragmented granular amylopectin starch hydrolysate will have utility as a thickener, bodying agent, or the like in foods that normally do not have a significant fat or oil component. Further, it is contemplated that the combined use of fragmented granular amylopectin starch with fragmented, granular amylose starch (e.g. as a blend) may have certain advantages in many of the compositions described herein. For example, the amylopectin based material may promote a unique consistency while the amylose based material provides greater heat stability to the blend.

The fragmented, granular starch hydrolysates, should not be subjected to conditions (e.g. elevated temperature) which will cause the hydrolysate fragments (i.e. a majority by weight thereof) to dissolve. Thus, if the food formulation is to be cooked or otherwise heated, to temperatures sufficient to gelatinize (i.e. dissolve) the hydrolysate, such heating should be completed prior to the addition of the hydrolysate to the food. It should be noted, however, that in many foods that are cooked, e.g. cheesecake, the internal temperature and/or moisture availability may be insufficient to dissolve the starch hydrolysate fragments.

In one aspect, this invention relates to a composition of matter comprising a foodstuff, a major amount of an aqueous liquid and a minor amount of a fragmented granular, amylopectin starch hydrolysate dispersed in said aqueous liquid, said hydrolysate being comprised of a major amount of cold-water insoluble hydrolysate and a minor amount of cold-water soluble hydrolysate. It is believed that the cold-water soluble hydrolysate material improves both the high-temperature stability of the cold-water insoluble hydrolysate material in the aqueous-dispersion and the water immobilization capability of such cold-water insoluble hydrolysate material, as compared to aqueous dispersion containing only cold-water insoluble material at the same level of cold-water insoluble material solids. As an amylopectin based material, the fragmented granular starch hydrolysate will exhibit a bimaximal profile of oligomers of varying degree of polymerization with (i) a maximum in proximity to a degree of polymerization of about 13, and (ii) a maximum in proximity to a degree of polymerization of about 26. (A profile of the oligomeric composition of a starch hydrolysate (the "oligomer profile") can be obtained by the method described by K. Koizumi, et al., "High-Performance Anion-Exchange Chromatography of Homogeneous D-Gluco-Oligosaccharides and -Polysaccharides (Polymerization Degree equal to or greater than 50) With Pulsed Amperometric Detection", *Journal of Chromatography*, 46, pp. 365–373 (1989), the disclosure of which is incorporated by reference herein.)

The fragmented, debranched amylopectin starch precipitate can generally be heated while in a food system to dissolve a substantial portion of the precipitate. It appears that upon cooling, the precipitate undergoes reprecipitation and the resulting food product displays acceptable organoleptic properties. In some food systems, however, reprecipitation of the precipitate may be inhibited or modified, i.e. by the presence of an ingredient that can interact with the solubilized precipitate. If undesirable reprecipitation will occur, the fragmented, debranched amylopectin starch precipitate should not be subjected to conditions (e.g. elevated temperature) which will cause the precipitate fragments (i.e. a majority by weight thereof) to dissolve. Accordingly, if the food formulation is to be cooked or otherwise heated, to temperatures sufficient to dissolve the precipitate, such heating should be completed prior to the addition of the precipitate to the food. It should be noted, however, that in many foods that are cooked, e.g. cheesecake, the internal temperature and/or moisture availability may be insufficient to dissolve the starch precipitate fragments.

In general, the blend of fragmented starch hydrolysate is incorporated into the food as an aqueous dispersion, typically comprised of a major amount (i.e. greater than 50% by weight) of water or other liquid medium and a minor amount (i.e. less than 50% by weight, typically 10% to 40%) of starch hydrolysate solids. Alternatively, the blend of fragmented starch hydrolysate can be mixed with the food along with water when the other ingredients of the food are capable of withstanding exposure to free water, e.g. a salad dressing or imitation sour cream. As noted above, the terms "food" and "foodstuffs" are intended broadly, as relating to both nutritional and/or functional food ingredients. It is contemplated that one or more food ingredients may be mixed with the aqueous dispersion of fragmented, amylopectin starch hydrolysate, or even dry mixed with the starch hydrolysate prior to mechanical disintegration.

Among the food ingredients in the food formulations of this invention include flavors, thickeners (e.g. starches and hydrophilic colloids), nutrients (e.g. carbohydrates, proteins, lipids, etc.), antioxidants, antimicrobial agents, non-fat milk solids, egg solids, acidulants, and so on.

Hydrophilic colloids can include natural gum material such as xanthan gum, gum tragacanth, locust bean gum, guar gum, algin, alginates, gelatin, Irish moss, pectin, gum arabic, gum ghatti, gum karaya and plant hemicelluloses, e.g. corn hull gum. Synthetic gums such as water-soluble salts of carboxymethyl cellulose can also be used. Starches can also be added to the food. Examples of suitable starches include corn, waxy maize, wheat, rice, potato, and tapioca starches.

Non-fat milk solids which can be used in the compositions of this invention are the solids of skim milk and include proteins, mineral matter and milk sugar. Other proteins such as casein, sodium caseinate, calcium caseinate, modified casein, sweet dairy whey, modified whey, and whey protein concentrate can also be used herein.

For many foods, it is accepted practice for the user to add the required amount of eggs in the course of preparation and this practice may be followed just as well herein. If desired, however, the inclusion of egg solids, in particular, egg albumen and dried yolk, in the food are allowable alternatives. Soy isolates may also be used herein in place of the egg albumen.

Dry or liquid flavoring agents may be added to the formulation. These include cocoa, vanilla, chocolate, coconut, peppermint, pineapple, cherry, nuts, spices, salts, flavor enhancers, among others.

Acidulants commonly added to foods include lactic acid, citric acid, tartaric acid, malic acid, acetic acid, phosphoric acid, and hydrochloric acid.

Generally, the other components of the various types of food formulations will be conventional, although precise amounts of individual components and the presence of some of the conventional components may well be unconventional in a given formulation. For example, the conventional other components for foods such as frozen desserts and dressings, are described in European Patent Publication No. 0 340 035, published Nov. 2, 1989, (the pertinent disclosure of which is incorporated herein by reference) and the components and processing of table spreads is disclosed in U.S. Pat. No. 4,869,919 (Lowery), the disclosure of which is incorporated by reference.

A particularly advantageous use of the fragmented starch hydrolysates described herein is the use thereof to replace a portion of the shortening used in a layered pastry article. In layered pastry articles (Danish, croissants, etc.) layers of a bread dough are assembled with a "roll-in" placed between the layers. The roll-in commonly contains a "shortening" (i.e. a fat and/or oil component) from an animal (e.g. butter) or vegetable (e.g. partially hydrogenated soybean oil) source. The assembled article, optionally containing a filling or topping, is then baked to form a finished pastry.

It has been found that at least a portion of the shortening of an otherwise conventional roll-in can be replaced with an aqueous dispersion of fragmented starch hydrolysate, preferably in admixture with an emulsifier (e.g. mono- and/or di-glycerides), and used to make a layered pastry. Further, not only does the resulting pastry have excellent organoleptic qualities when fresh from the oven, but many of these excellent qualities are maintained (at least with an amylopectin starch hydrolysate) for an extended period of time under conventional ambient temperature storage conditions. Thus, the use of such a roll-in should extend shelf life of the finished pastry. In particular, the little, if any, observable change in texture of a Danish prepared as described herein is a surprising and distinctly useful advantage over conventional Danish. Moreover, the Danish, when reheated in a microwave appears remarkably resistant to microwave toughening.

The following examples will illustrate the invention and variations thereof within the scope and spirit of the invention will be apparent therefrom. All parts, percentages, ratios and the like are expressed by weight throughout this specification and the appended claims, unless otherwise noted in context.

EXAMPLES

Examples 1-18 below will illustrate methods of producing debranched starch hydrolysates and the fragmentation thereof to produce cremes. Examples 19 and 20 will illustrate methods of producing granular starch hydrolysates. Examples 21 and 22 will illustrate the production of blends of this invention.

Example 1

A totally debranched, waxy maize starch precipitate was prepared and fragmented as follows. Into a 3-liter stainless steel beaker was placed 2,000 grams of aqueous slurry containing 5% dry solids waxy corn starch. The pH was adjusted to 4.5 using 0.5N HCl and the beaker was placed in a 95° C. water bath. The slurry was stirred and allowed to gelatinize and heat at 93°-95° C. for 20-30 minutes. The major portion of the resulting waxy starch paste (1,150 grams paste) was placed into a pressure reactor and heated to 160° C. with stirring. After stirring at 160° C. for 30 minutes, the waxy starch solution was cooled to 45° C. and transferred to a 2-liter 3-neck round bottom flask equipped with stirrer, thermometer and a temperature controlled water bath. To the flask at 45° C. and pH 4.5 was added 50 units isoamylase enzyme (Sigma Chemical Company, St. Louis, Mo.) per gram dry basis of starch. The enzyme reaction was allowed to proceed with stirring at 45° C. for 48 hours. At the end of this period, the solution was heated to boiling (approximately 100° C.) to inactivate enzyme then cooled and evaporated to 20% solids using a rotary evaporator.

The resulting solution was allowed to set in a refrigerator to precipitate/crystallize. The resulting slurry was centrifuged at about 10,000 g-force RCF in a Sorvall Centrifuge (GSA rotor) for 20 minutes. The supernatant was decanted. The sediment was resuspended in water to the original 20% solids concentration volume, heated to boiling then cooled and again allowed to precipitate/crystallize on standing in a refrigerator. The resulting slurry was centrifuged as before and the sediment dried at 50° C. on a stainless tray in a forced air oven. The yield of product was calculated to be 81.3% on a dry basis.

Three additional samples were prepared in a similar manner with minor variations in treatment. Portions of all four samples were combined and heated to boiling to solubilize almost all material present in the 20% solids preparation. The hot solution was filtered through Whatman No. 1 filter paper on a Buchner funnel and the clear filtrate was placed in a refrigerator overnight to precipitate/crystallize. The resulting mass was filtered using Whatman No. 1 filter paper on a Buchner funnel and the precipitated mass was washed with additional water. The resulting wet cake was dried on a stainless steel tray overnight in a forced air oven at 50° C. The dried product was ground to pass through a US #60 mesh sieve and bottled.

Into a 250 ml 3-neck round bottom flask was placed 65.0 grams of the dried product above (57.5 grams dry basis) and 106.7 grams of acidic aqueous solution containing 3.87 grams of 100% HCl (approximately 1N HCl solution). The mixture was heated to 60° C. in a water bath and stirred at 60° C. for 24 hours. The mixture was adjusted to pH 4.5 with 4% NaOH and then centrifuged. The supernatant was discarded and the sediment resuspended in the same volume of water and centrifuged again. The wet cake was dried in a forced air oven.

A 20.0% solids creme of the above product was prepared by simply blending at full speed in a Waring blender at 60° C. for approximately 8 minutes with the temperature controlled. Yield stress of the creme was found to be 522 pascals. The creme had a very smooth consistency and excellent body when rubbed between the finger and thumb. Based on our experience, this product would make a good fat replacer.

Example 2

A totally debranched common (dent) corn starch was prepared by enzymatic hydrolysis with isoamylase. The liquefaction of the starch involved heating a 5% d.s. starch slurry to 95° C. and holding it for 20 minutes. The hot slurry was placed into a Bomb reactor and heated to 160° C. The liquefied starch was vented through a cooling coil to a 3-neck flask equipped with a Servodyne mixer and contained in a 45° C. circulating bath.

The liquefied starch was then prepared for the enzyme hydrolysis. The pH was adjusted to 4.5 with 1N HCl and the temperature of the slurry was allowed to reach 45° C. The isoamylase (Hayashibara) was added to the slurry at 100 units per gram dry basis of the starch. After 24 hours, the reaction slurry was heated to greater than 80° C. for 20 minutes to inactivate the enzyme. The slurry was concentrated to 20% d.s. on a rotoevaporator. The resulting solution was placed in a beaker, covered, and allowed to crystallize overnight at refrigerated temperature. The resulting material was centrifuged at 10,000 rpm for 20 minutes. The supernatant was decanted and the pellet resuspended to the original weight. This slurry was recrystallized by heating to greater than 90° C. and refrigerating overnight. The crystallized material was spread on a stainless steel tray and dried at 50° C. The dried material was ground so that it would pass a U.S. #60 mesh screen.

The dried totally debranched starch material was sheared at 60° C. for 8 minutes in a Waring blender. The resulting dispersed material had a fat-like lubricating property and a yield stress of 211 Pa. The yield stress and texture were similar to our first debranching of the waxy maize starch.

Example 3

A totally debranched waxy maize starch was prepared by enzymatic hydrolysis with isoamylase (Hayashibara). A 20% d.s. slurry of waxy maize starch was jet cooked at 310° F. and 60 psi. A portion of the resulting liquefied starch was placed into a 3-neck round bottom flask equipped with a stirrer, thermometer and a 45° C. temperature controlled water bath. The pH of the slurry was adjusted to 4.5 with 1N HCl. The isoamylase enzyme was added to the slurry at 200 units per gram dry basis of the starch. After 48 hours, the reaction slurry was heated to greater than 80° C. for 20 minutes to inactivate the enzyme. The resulting solution was placed into a beaker, covered and allowed to crystallize overnight at refrigerated temperatures. The resulting material was heated to 95° C. and left to recrystallize at refrigerated temperatures overnight. The recrystallized material was then spread on a stainless steel tray and dried overnight at 50° C. The material was ground to a fine powder on a TROST mill and sieved through a 38 micron screen.

The resulting powder of the precipitate from above was prepared as a 30% d.s. creme for use in making a reduced fat sour cream. The creme preparation involved making a 30% d.s. slurry of the precipitate and heating it to 75° C. The hot slurry was sheared in a MICROFLUIDIZER using module 1351 and 15,000 psi. The resulting creme was incorporated into the following reduced fat sour cream formula:

| Ingredients: | % |
| --- | --- |
| Precipitate (30% d.s. creme) | 39.79 |
| Sour cream | 29.83 |
| Water | 23.41 |
| Non-fat dry milk | 5.97 |
| Lactic acid 88% | 0.40 |
| Xanthan gum | 0.20 |
| Salt | 0.20 |
| Sodium citrate | 0.20 |

Procedure:

Lactic acid was added to the water and mixed well with a Kitchen Aide mixer. The dry ingredients were added and incorporated into the water making a slurry. The precipitate salve and the sour cream were blended into the slurry. The resulting material was hand homogenized and refrigerated.

The sour cream prototype made using the precipitate demonstrated good quality texture, appearance, and flavor.

Example 4

A totally debranched waxy maize starch precipitate was prepared and treated with α-amylase, before fragmentation, as follows. Into a Groen kettle was placed 25,400 grams of deionized water and 8,400 grams waxy maize starch (11.1% moisture) with stirring. The resulting slurry was jet cooked at 310° F. to give a 20% solids waxy maize starch paste.

Into a 5,000 ml 3-neck round bottom flask was placed 3,200 grams of the waxy maize starch paste above. The solution was agitated and the pH adjusted to approximately 4.2 with 1N HCl. With agitation at 1,000 RPM, 128,000 units of isoamylase (Hayashibara) enzyme (200 units/gram dry starch) was added at 45° C. The reactor contents were allowed to react at 45° C. for 24 hours. The temperature was increased and the contents were heated at about 85° C. for about 25 minutes to inactivate the enzyme. The resulting solution was placed in a refrigerator where crystallization took place. The precipitated mass was heated to above 90° C. then allowed to set in the refrigerator overnight. The mass was then dried at 55° C. in a forced air oven. It was found by GPC chromatography that the product had 82% material less than 20,000 molecular weight.

Into a 2-liter glass beaker was placed 218 grams (200 grams dry basis) of the debranched waxy maize starch above, 16 grams of 1M phosphate buffer and 766 grams deionized water giving a 20% suspension in 20 millimolar phosphate buffer. The suspension was heated to about 100° C. (boiling) to dissolve most starch then cooled to 25° C. to give freshly precipitated/crystallized material.

To one half of the above freshly precipitated material, with the pH adjusted to 6.9, with agitation was added 1,500 units (51 microliters) of porcine pancreatic α-amylase (Sigma Chemical Company #A 6255) and the mixture was allowed to react at 25° C. for 24 hours. The slurry tended to thin out and stirred better with time. After 24 hours, the mixture was slowly mixed with 8 volumes of ethanol to precipitate the solids and inactivate the α-amylase enzyme. The alcohol precipitated slurry was centrifuged at 5,000×g for 10 minutes and the sediment was dried first in air then in a vacuum oven at approximately 1.5 mm Hg and 50° C. overnight. The resulting product was ground to pass through a US #60 mesh sieve then bottled and labeled.

A 20.0% solids slurry of the above product was sheared using a small Waring blender with temperature controlled water jacket (e.g. 120 V, 60° C., 8½ minutes). After setting 3 hours, the yield stress was measured and found to be 408 pascals. On tasting, the texture was found to be creamier with no chalkiness of a similar preparation that had not been treated with α-amylase. Based on our experience, this product would be useful as a fat replacer.

Example 5

Into a 3-liter, 3-neck round bottom flask equipped with stirrer, thermometer and temperature regulated water bath was placed 2,200 grams of 5% solids gelatinized waxy maize starch paste, previously heated to 96° C. for 30 minutes, heated to 160° C. for 30 minutes, then cooled to room temperature. To the waxy maize paste at pH 6.6 was added 11,000 units (100 units/gram dry starch) of Novo Nortek Promozyme Pullulanase Enzyme. The mixture was stirred and maintained at 58°–60° C. for 24 hours. Samples were taken at 6 hour, 18 hour, and 24 hour reaction periods, heated to about 90° C. for about 10 minutes to inactivate enzyme, then freeze dried and analyzed by gel permeation chromatography (GPC) molecular weight.

After 24 hours, the reaction mixture was heated to about 90° C. to inactivate enzyme and the hot solution filtered through Whatman #2 filter paper in a Buchner funnel. The slurry was concentrated via rotary evaporator to 20% solids, then placed into a refrigerator at 4° C. overnight.

The resulting precipitated mixture was centrifuged and the supernatant discarded. The sediment was resuspended in an equal volume of water, heated to about 90° C. and allowed to precipitate in a refrigerator at 4° C. overnight. The precipitated mixture was centrifuged and the supernatant was discarded. The sediment was dried on stainless steel trays at 35° C. overnight. The dried product was ground to pass through a US #60 mesh sieve. Gel permeation chromatography (GPC) analytical results are reported below.

| Reaction Time (hr) | $M_w$ | $M_n$ | $M_w/M_n$ | Peak Molecular Weights | Percent Less Than 20,000 Molecular Weight |
|---|---|---|---|---|---|
| 6 | 15,400 | 1,186 | 12.9 | 75,224;2556;335 | 87.5 |
| 18 | 7,900 | 1,074 | 7.3 | 64,412;2637;335 | 94.3 |
| 24 | 6,747 | 1,014 | 6.7 | 62,000;2772;345 | 95.2 |

If a finding of >80% saccharides having less than 20,000 molecular weight is considered as substantially completely debranched then it can be seen that complete debranching was achieved using pullulanase enzyme.

Examples 6–13

A series of debranched starch products were prepared from waxy maize starch under conditions similar to those employed in Examples 1 or 5, with isoamylase or pullulanase, respectively. Variations in conditions employed and results are shown in Table 1.

TABLE 1

| | EXAMPLE | | | | | | | |
|---|---|---|---|---|---|---|---|---|
| | 6 | 7 | 8 | 9 | 10 | 11 | 12 | 13 |
| % Conversion | 93 | 96 | 82 | 85 | 100 | 57 | 57 | 69 |
| Debranching enzyme (P — pullulanase) (I — isoamylase) | P | P | I | I | I | P | P | P |
| % Cold water solubles, powder | 31.7 | 37.7 | 21.4 | 30.6 | 24.7 | 34.4 | 99.2 | 29.6 |
| Yield stress, pascals | 118 | 17 | 498.5 | 1110 | 428 | Too gelled | Too gelled | Too gelled |
| % Cold water solubles, creme (gel) | 25.5 | — | — | — | — | — | 13.8 | 11.5 |
| DSC: Onset °C. | 54 | 47 | 45 | — | 57 | — | 43 | 47 |
| Enthalpy | 13.8 | 21.3 | 23.6 | — | 20.6 | — | 9.5 | 29.3 |
| Water immobilization (sec$^{-1}$ by $^{17}$O NMR) | 119 | 115 | 697 | — | — | — | 209 | 353 |
| Ratio of 1,4:1,6 linkages (by NMR) | >400/1 | * | 110/1 | — | — | 31/1 | 31/1 | 120/1 |
| Concentration of starch (during hydrolysis) | 20 | 5 | 20 | 20 | 5 | 20 | 20 | 20 |
| Units of enzyme (per g starch) | 62.5 | 100 | 200 | >200 | 100 | 3.79 | 3.79 | 7.5 |
| Number of precipitations | 2 | 2 | 2 | 2 | 2 | 1 | 0 | 2 |
| Centrifugation | Yes | Yes | No | No | No | No | No | No |

*No α-1,6 linkages detected

Example 14

Dynamic strain sweep evaluations were performed using a model VOR Bohlin Rheometer on sheared waxy maize starch products debranched to varying degrees from 57% to 100% (e.g. 57% to 100% of the products had a molecular weight of less than 20,000) and fragmented as 25% precipitate solids in water to form a creme.

The strain sweep experiments were conducted with the creme products at 1 Hz frequency using a concentric cylinder geometry. During the test, strain was increased by changing oscillation amplitude and the dynamic elastic modulus (G') was measured as a function of strain.

The G' values correspond to the strength of the network structure in the creme. The creme displays linear viscoelasticity at very low strains., i.e. G' is independent of strain. Its behavior becomes non-linear (G' decreases as strain increases) at a certain critical strain where the material structure becomes more "deformable". A short or brittle material will display a transition from linear to non-linear viscoelasticity at a lower strain. If the transition occurs at a higher strain, this indicates a long and cohesive texture.

It can be seen from FIG. 1 that at 57% debranching (:Curve A) there is no break in structure observed even at high strain. At about 69% debranching (Curve B), a break in structure is observed at about 10 millistrain. At about 85% (Curve C) and higher debranching (100%, Curve D), we can see structure Breakdown at less than about 1 millistrain which is closer to the value (Curve E) observed for a commercially available brand of hydrogenated shortening (i.e. CRISCO ™, Procter & Gamble Co., Cincinnati, Ohio).

In general, particle gel compositions deform at low strain values and usually do so with large changes in G' values. By contrast, polymer network gels usually deform at high strain values and typically display relatively low changes in G' values.

Example 15

Two experiments were conducted whereby waxy maize starch was first jet cooked, cooled and debranched with isoamylase enzyme. Then, using a programmable waterbath, the 15% solids debranched starch solutions were subjected to multiple heating and cooling cycles to promote formation of increasing quantities of thermostable crystalline product.

Thus, 3,507 grams of 15% dry solids waxy maize starch paste previously jet cooked using typical conditions (310° F. and 80 lbs. steam) was adjusted to pH 4.5 and reacted with 200 units isoamylase enzyme (Hayashibara) per gram of starch at 45° C. in a 5-liter, 3-neck round bottom flask for 66 hours. Gel permeation chromatography analysis showed 100% debranching (i.e. 100% of the material was less than 20,000 molecular weight).

After heating to inactivate the enzyme, the solution of debranched waxy maize starch was placed in a waterbath equipped with programmable heating and cooling capabilities. The waterbath heated the flask contents to 99° C. and held it there for 60 minutes then cooled to 4° C. and held at that temperature for 60 minutes. The cycle of heating and cooling were repeated a total of eight times. Samples of product suspension were withdrawn periodically during the heat treatment, dried, ground and analyzed for crystallinity via differential scanning calorimetry (DSC). The results are presented in Table 2.

TABLE 2

DSC Analysis of 100% Debranched Waxy Maize Starch Crystallized During Multiple Cycling of Temperature from 99° C. to 4° C.

| Number of Crystallization Cycles Completed | Melting Onset Temp °C. | Melting End Temp °C. | Total Enthalpy J/g | Enthalpy <75° C. % | Enthalpy >75° C. % |
|---|---|---|---|---|---|
| 2 | 46 | 121 | 26 | 27 | 73 |
| 6 | 46 | 132 | 28 | 19 | 81 |
| 8 | 47 | 132 | 26 | 17 | 83 |

It can be seen from Table 2 that the percentage of product greater than about 75° C. in melting temperature reached a maximum (about 80% of the total crystalline material present) after about 6 heating/cooling cycles. This represents a high percentage of product with melting point above 75° C. Thus, it is possible that this product could be heated in water to 75° C. to solubilize the melted fraction while keeping the more stable (>75° C.) fraction intact. The two components could then be separated (e.g. by microfiltration) to give a new heat-stable product that is essentially all stable up to about 75° C.

From observation of the actual individual DSC scans whose results are summarized in Table 2, it was noted that the 100% debranched waxy maize starch product recrystallized by recycling from 99° C. to 4° C. formed a major peak centered at about 115° C. while reducing the size of the peak at about 85° C. as the number of crystallization cycles increased.

Another batch of waxy maize starch was jet cooked and debranched in a similar manner but at about 17% solids and for 48 hours, giving a product about 70% debranched. This product was cycled in a similar manner by heating to 75° C. and cooling to 25° C. After the final cycle, number 8, the product was split into two portions, one of which was analyzed without washing and the other, 8(w), was washed with water before analysis. These results are presented in Table 3. Another sample of this 70% debranched product was held at 75° C. without cycling for the time equal to 6 cycles; one portion was collected without washing (A) and a second portion was collected after a water wash (B).

TABLE 3

DSC Analysis of 70% Debranched Waxy Maize Starch
Crystallized During Multiple Cycling of Temperature from 75° C. to 25° C.

| Number of Crystallization Cycles Completed | Melting Onset Temp °C. | Melting End Temp °C. | Total Enthalpy J/g | Enthalpy <75° C. % | Enthalpy >75° C. % |
|---|---|---|---|---|---|
| 1 | 48 | 102 | 22 | 48 | 52 |
| 2 | 49 | 105 | 19 | 31 | 69 |
| 6 | 42 | 109 | 19 | 54 | 46 |
| 8 | 48 | 111 | 16 | 47 | 53 |
| 8 | 49 | 108 | 17 | 47 | 53 |
| A | 49 | 100 | 20 | 54 | 46 |
| B | 47 | 92 | 21 | 47 | 53 |

In Table 3, it can be seen that the 70% debranched product appeared to reach a maximum percentage of more stable product (e.g. >75° C. melting point) after two heating/cooling cycles, but this did not appear to continue to be the case after additional cycles. The relatively low percentage of enzyme conversion no doubt contributed to this lower overall yield of stable product. In addition, the lower maximum temperature for heating also likely had a negative effect. From observation of the actual DSC scans, it was seen that the peak centered at about 95° C. increased with the number of heating cycles while the peak centered at about 75° C. decreased.

Overall, a high yield of thermostable product is achieved by cycling highly debranched waxy maize starch at relatively high temperature through at least two heating/cooling cycles.

Example 16

ACID HYDROLYSIS OF HEAT TREATED, DEBRANCHED 55% HIGH AMYLOSE CORN STARCH

A 2% solids slurry of 55% high amylose corn starch (HI-SET C) was prepared by mixing 452.3 grams (400 grams dry basis) of HI-SET C corn starch with deionized water to give a total volume of 20 liters. The suspension was heated in 2-liter batches up to 160° C. in a pressure reactor then cooled to about 30° C. to 50° C. by passing the hot solution through a cooled heat exchanger tube. The pH of the solution was adjusted to approximately 4.5 and the solution was placed in two 12-liter round bottom flasks equipped with agitation, condensers, and heat controlled water baths. The temperature was adjusted to 45° C. and 400 units per gram dry basis starch of isoamylase enzyme (from Hayashibara Co. and containing 865,000 units/gram) was added to each solution. The solutions were allowed to react 20 hours then the 2% solids solutions/dispersions (the debranched starch tends to precipitate with time) were heated to 160° C. in the pressure reactor as before to completely dissolve the precipitated starch and make it more readily available for isoamylase enzyme attack. The solutions were cooled, the pH again checked and found to be approximately 4.5, then 400 units per grams dry basis starch of isoamylase enzyme was again added and the reaction was allowed to proceed 18 hours at 45° C. for a total reaction time of 38 hours.

The 2% solution/suspension after 38 hours of isoamylase digestion was heated to approximately 95° C. to inactivate enzyme then concentrated by rotary evaporation over a 2-day period (stored in a refrigerator overnight) to approximately 15% solids. This slurry was dried on stainless steel trays at 60° C. in a forced air oven overnight and the dried material ground to pass through a US #60 mesh sieve.

To 380 grams (350 grams dry basis) of the above dried, screened material was added 1,720 grams of deionized water to give a 20% solids slurry. The slurry was heat treated by controlled heating in a temperature controlled water bath from 50° C. up to 100° C. at the rate of 0.05° C. per minute followed by controlled cooling from 100° C. down to 50° C. at the rate of 0.05° C. per minute. The heat treated slurry was poured onto a stainless steel tray and dried in a forced air oven at 50° C. then ground to pass through a US #60 mesh sieve. This sample served as a substrate for acid hydrolysis treatments to improve the ease of creme formation on shearing.

The above starch substrate was acid hydrolyzed at 35% solids (a thick slurry) at 80° C. with an HCl solution of 0.14 Normality (includes all water and acid present in the slurry). Samples of reaction slurry were withdrawn after 6 hours, 12 hours, 18 hours and 24 hours of hydrolysis at 80° C., adjusted to pH 4.5, then tray dried at 50° C. and ground to pass through a US #60 mesh sieve. Additional samples hydrolyzed at 6 hours and 24 hours were washed to remove most solubles. The washing procedure followed diluting the reaction slurries approximately 50:50 with water then neutralizing with 5% NaOH. The neutralized slurries were centrifuged at 8,000×g for 10 minutes and the supernatant discarded. Deionized water was added back to the sediment to give the same original weight of slurry and the sediment was dispersed uniformly in the water and centrifuged. This process was repeated two more times. The samples were then tray dried as outlined above. Finally, one sample hydrolyzed for 6 hours was washed as outlined above but not dried. It was saved in the wet state. All samples were then sheared using a laboratory Waring blender with a small jacketed jar at 20% solids, 120 volts, 60° C. for 8½ minutes. After setting for at least 3 hours, the yield stress values were measured using a Brookfield viscometer. The results are reported below:

| Acid Hydrolysis Time, hr, | Yield Stress of 20% Cremes, Pascals | | |
|---|---|---|---|
| | No Wash/ Separation | Washed | Washed But Not Dried |
| 0 | 36 | — | — |
| 6 | 233 | 550 | 731 |
| 12 | 277 | — | — |
| 18 | 289 | — | — |
| 24 | 211 | 615 | — |

Estimates of product yields based on dry substance recoveries from the experiments are 69.9% for the washed 6 hour hydrolysis sample, 99.4% for the no wash/separation 24 hour hydrolysis sample, and 60.5% for the washed 24 hour hydrolysis sample.

It can be seen that as the hydrolysis of the unwashed, unseparated samples continued there was a maximum yield stress value reached then a decline due to overhydrolysis and subsequent conversion into soluble saccharides that contribute nothing to yield stress values. The yield stress values of these unwashed, unseparated products were generally lower than the typical 400 to 600 pascals desired. If the relative amount of insolubles could be increased in the starting material then we would expect higher yield stress values for these unwashed, unseparated products.

For those products washed to remove soluble saccharides, the yield stress values were much higher and well within the desired range. For the sample that was washed but not dried, there was a considerable increase in yield stress. This would indicate that drying tends to reduce yield stress values.

It is concluded that acid hydrolysis is beneficial in increasing the ease of shearing of heat treated, debranched 55% high amylose corn starch.

Example 17

ALPHA-AMYLASE HYDROLYSIS OF HEAT TREATED, DEBRANCHED 55% AMYLOSE CORN STARCH

A 2% solids slurry of 55% high amylose corn starch (HI-SET C) was prepared by mixing 452.3 grams (400 grams dry basis) of HI-SET C corn starch with deionized water to give a total volume of 20 liters. The suspension was heated in 2-liter batches up to 160° C. in a pressure reactor then cooled to about 30° C. to 50° C. by passing the hot solution through a cooled heat exchanger tube. The pH of the solution was adjusted to approximately 4.5 and the solution was placed in two 12-liter round bottom flasks equipped with agitation, condensers, and heat controlled water baths. The temperature was adjusted to 45° C. and 400 units per gram dry basis starch of isoamylase enzyme (from Hayashibara Co. and containing 865,000 units/gram) was added to each solution. The solutions were allowed to react 20 hours then the 2% solids solutions/dispersions (the debranched starch tends to precipitate with time) were heated to 160° C. in the pressure reactor as before to completely dissolve the precipitated starch and make it more readily available for isoamylase enzyme attack. The solutions were cooled, the pH again checked and found to be approximately 4.5, then 400 units per gram dry basis starch of isoamylase enzyme was again added and the reaction was allowed to proceed 18 hours at 45° C. for a total reaction time of 38 hours.

The 2% solution/suspension after 38 hours of isoamylase digestion was heated to approximately 95° C. to inactivate enzyme then concentrated by rotary evaporation over a 2-day period (stored in a refrigerator overnight) to approximately 15% solids. This slurry was dried on stainless steel trays at 60° C. in a forced air oven overnight and the dried material ground to pass through a US #60 mesh sieve.

To 380 grams (350 grams dry basis) of the above dried, screened material was added 1,720 grams of deionized water to give a 20% solids slurry. The slurry was heat treated by controlled heating in a temperature controlled water bath from 50° C. up to 100° C. at the rate of 0.05° C. per minute followed by controlled cooling from 100° C. down to 50° C. at the rate of 0.05° C. per minute. The heat treated slurry was poured onto a stainless steel tray and dried in a forced air oven at 50° C. then ground to pass through a US #60 mesh sieve. This sample served as a substrate for $\alpha$-amylose hydrolysis treatment to improve the ease of creme formation on shearing.

The above starch substrate was enzyme hydrolyzed at 20% solids (375 grams total slurry wt.) at 25° C. with 15 units/gram starch of porcine pancreatic $\alpha$-amylase (Sigma Chemical Company). Samples of reaction slurry were withdrawn (125 grams each) after 8 hours, 21 hours, and 48 hours of hydrolysis and the pH adjusted to 3.5 to inactivate enzyme. The 8 hour and 21 hour samples were filtered on a Buchner funnel followed by washing with about 250 ml each with deionized water. The sample hydrolyzed 48 hours would not filter (very, very slow) and was centrifuged (7,000×g), the supernatant discarded, then deionized water added back to the original sample weight. After stirring to give a homogenous mixture, this slurry was centrifuged as above and the supernatant discarded. This procedure was repeated a final time. All wet cakes or sediment (from filtration or from centrifugation) were mixed with 8 volumes of ethanol (formula 3A) to denature any remaining enzyme. They were then either filtered or centrifuged one last time. The wet cakes and sediment were dried in a 50° C. forced air oven and ground to pass through a US #60 mesh sieve. The products were weighed and yields were calculated for each. Yield stress values were obtained on 20% solids cremes prepared by shearing at 120 volts, 60° C: for 8½ minutes with a Waring blender equipped with a small jacketed jar. The yield stress values were measured using a Brookfield viscometer after the cremes stood at least 3 hours at room temperature. The analytical results are reported below.

| $\alpha$-Amylase Hydrolysis Time, hr. | Product Yield, % db | Yield Stress, Pascals |
|---|---|---|
| 0 | — | 36 |
| 8 | 87.0 | 288 |
| 21 | 84.2 | 348 |
| 48 | 80.9 | 365 |

It was noted that the texture of the 8 hour creme was the most gritty while the 48 hour sample was more creamy and less gritty. It is speculated that continued enzyme hydrolysis would continue to improve texture (less gritty) and increase yield stress values.

It was noted that the pH of the 48 hour hydrolyzed sample declined to 5.7 (from 6.9). It is likely that this was caused by undesirable fermentation to form organic acids. Such a large decline in pH likely also caused reduced enzyme hydrolysis activity compared to what may have occurred if the pH had remained at 6.9.

It is concluded that the enzyme hydrolysis gave considerable improvement in the shearability of the heat treated, debranched high amylose starch. In addition, it also resulted in improved smoothness of texture.

Example 18

THERMOSTABLE PULLULANASE ENZYME TREATMENT

A 55% amylose corn starch (HI-SET C) is made up to 25% solids then jet cooked at 160° C. with a retention time of 10 minutes at 160° C. then cooled to ~100° C. The pH of the solution is adjusted to pH 6.0.

Novo thermostable pullulanase enzyme, as described in WO 92/02614, is added at 50 units per gram of starch and the reaction is allowed to proceed at 100° C. for 24 hours at which time GPC analysis will show that less than 10% of the remaining amylose and amylopectin molecules are above about 100,000 molecular weight.

The debranched solution is treated with 3% w/w (weight by weight basis) of decolorizing carbon (based on starch dry substance weight) at 90° C. The colorless carbon treated solution is cooled to 5° C. for 16 hours to bring about crystallization. The crystallized mass is dried in a spray drier at 15% solids after dilution with water.

The spray dried material is made up to 20% solids and heated from 50° C. to 100° C. at 0.05° C./minute then cooled to 100° C. at 0.05° C./minute. The heat treated material is treated at 20% solids at 80° C. for 24 hours in 0.2N HCl then cooled to room temperature. The acidic slurry is adjusted to pH 4.5 with 10% NaOH and microfiltered to reduce the soluble saccharide content to less than 10% (measured at room temperature). The slurry is spray dried at about 15% solids to give a heat stable, shearable starch based fat replacer having a yield stress at 20% solids greater than 400 pascals.

Example 19

A high amylose granular starch hydrolysate can be prepared as follows:

| Ingredients | Per 100 lbs. ds starch | Per 800 lbs. as is batch |
| --- | --- | --- |
| High amylose corn starch (HI-SET C) | 100 lbs. | 708 lbs. |
| Muriatic acid (HCl), 20° Baume | 10.7 lbs. | 76 lbs. |
| Sodium hydroxide, ds | 3.7 lbs. | 26 lbs. |

Procedure

Add 149 gals. city water to heated and agitated tank. Turn agitator on high and add 800 lbs. as is HI-SET C. (The HI-SET C is optionally pretreated in accordance with the teachings of U.S. Pat. No. 4,477,480.) Adjust slurry solids to 35.0 to 36.5%, if necessary. Heat slurry to 70° C. Add 76 lbs. of 20° Baume muriatic acid. Check titer and adjust to 0.322 meq/g, if necessary. Turn agitator to low and heat to 70° C.

React at 70° C. for about 5.5 hrs. until a dextrose concentration of 1.00% (measured by a dextrose analyzer such as Model 2700, Yellow Springs Instrument Co.) is present in the reaction medium supernate. After 2 hrs. of reaction, check dextrose. When dextrose will be 1.00%, neutralize to 3.0 to 4.0 pH with 50% caustic solution. Heat slurry to 90° C. and maintain temperature for 1 hr. Cool to 70° C., transfer to microfiltration feed tank.

Concentrate slurry to about 44% solids and diafilter to 1.5% ash in microfiltration unit. Spray dry microfiltration retentate.

Example 20

A granular starch hydrolysate can be prepared from common (dent) corn starch as follows:

| Ingredients | Per 100 lbs. ds starch | Per 800 lbs. as is batch |
| --- | --- | --- |
| Dent corn starch | 100 lbs. | 720 lbs. |
| Muriatic acid, 20° Baume | 10.7 lbs. | 77 lbs. |
| Sodium hydroxide | 3.7 lbs. | 27 lbs. |

Procedure

Add 150 gals. city water to heated and agitated tank. Turn agitator on high and add 800 lbs. as is dent corn starch. (The dent corn starch is optionally pretreated in accordance with the teachings of U.S. Pat. No. 4,477,480.) Adjust slurry solids to 35.0 to 36.5%, if necessary. Heat slurry to 60° C. Add 77 lbs. of 20° Baume muriatic acid. Check titer and adjust to 0.322 meq/g, if necessary. Turn agitator to low and heat to 60° C.

React at 60° C. to a dextrose concentration in the supernate of 1.17%. After 12 hrs. of reaction, pull a sample every 2 hrs. and measure dextrose concentration. When dextrose is expected to be 1.17%, neutralize to 3.0 to 4.0 pH with 50% caustic solution. Heat slurry to 70° C. and let stir for 1 hr. Heat slurry to 80° C. and let stir for 1 hr. Cool at 70° C., transfer to microfiltration feed tank.

Concentrate slurry to about 44% solids and diafilter to 1.5% ash in the microfiltration unit. Spray dry microfiltration retentate.

Example 21

Slurries were prepared at 15% by weight solids (i.e. 85% by weight water) by simple dilution with simple mixing of the following dry solids:

Control A: 60 parts by weight dry solids of granular starch hydrolysate (an acid-modified food starch commercially available from the A. E. Staley Manufacturing Company as STELLAR fat replacer powder) diluted to 400 parts by weight with tap water.

Blend B: 57 parts by weight of dry solids of STELLAR granular starch hydrolysate powder and 3 parts by weight of a low viscosity carboxymethyl cellulose (available from Aqualon Company, Wilmington, Del., as CMC-7LF) diluted to 400 parts by weight with tap water.

Blend C: 57 parts by weight of dry solids of STELLAR granular starch hydrolysate powder and 3 parts by weight of a high viscosity carboxymethyl cellulose (available from Aqualon Company, Wilmington, Del., as CMC-7HF) diluted to 400 parts by weight with tap water.

Blend D: 58.8 parts by weight of dry solids of STELLAR granular starch hydrolysate powder and 1.2 parts by weight of a xanthan gum (available from Kelco Division of Merck & Co., San Diego, Calif., as Keltrol TF) diluted to 400 parts by weight with tap water.

The slurries were sheared in the Microfluidizer at 8,000 psig at an output temperature of 56°–60° C. The resulting cremes were diluted to 10% solids and spray dried using a Virtis laboratory spray drier (inlet temp 193° C., outlet 100°–105° C.). The spray dried products were redispersed at room temperature at 20% solids in water using a stirring motor with a low shear agitator stirring at 1,400 rpm for 10 minutes. The resulting cremes were similar in texture to cremes prepared in a Microfluidizer except that the sample having no added hydrocolloid took longer to disperse and had a lower yield stress, as shown in the table below.

| Sample | Yield Stress (Pascals) | Observations |
| --- | --- | --- |
| A | 312 | Dispersed after 2-3 min., slightly chalky |
| B | 494 | Dispersed in about 30 sec., not chalky |
| C | 612 | Dispersed in about 30 sec., not chalky, tacky texture |
| D | 511 | Dispersed in about 1 min., not chalky, off flavor |

Example 22

Slurries can be prepared at 15% by weight solids (i.e. 85% by weight water) by simple dilution with simple mixing of the following dry solids:

Example 23

A second series of samples were prepared substantially as described in Example 21. The level of additive is expressed on a dry solids basis (i.e. wt. % of total dry solids which excludes the water added and the residual moisture in the starch hydrolysate).

Samples were sheared at 15% solids, diluted to 10% and spray dried. Dried samples were redispersed at 20% solids at room temperature at 1,400 rpm for 10 minutes.

Surf A is Durfax 80, a polyoxyethylene (20) sorbitan monooleate, available from ICI Americas.
Surf B is San Tone 8-1-0, polyglycerol esters of fatty acids, available from Van den Bergh Foods.
Surf C is Tween 61, a polyoxyethylene (20) sorbitan monostearate, available from ICI Americas.
Surf D is lecithin.

| Blend | | Additive | Level (%) | Yield Stress (Pascals) | Dispersion Time | Comments |
| --- | --- | --- | --- | --- | --- | --- |
| Control | I | None | — | 386 | 1.5 min. | Sl. chalky |
| | J | Surf A | 0.1 | 302 | 55 sec. | Not chalky |
| | K | Surf A | 1.0 | 245 | 1 min. | Foamy, not chalky |
| | L | Surf B | 0.1 | 386 | 45 sec. | Not chalky |
| | M | Surf B | 1.0 | 360 | 45 sec. | Not chalky |
| Control | N | None | — | 312 | 1 min. | Sl. chalky, thin, smooth |
| | O | CMC 7MF | 5.0 | 569 | Immediate | Slick, waxy, thick mouthcoat |
| | P | Guar gum | 5.0 | 615 | Immediate | Lumpy, slick, retention, mouthcoat |
| | Q | Guar gum | 2.0 | 500 | 30 sec. | Smooth, slick, v. sl. chalky, waxy |
| | R | CMC 7LF | 2.0 | 396 | | Smooth, good texture |
| | S | Cooked waxy maize starch | 5.0 | 43 | 30 sec. | Syneresis, chalky, no body, grainy |
| Control | T | None (unsheared) | — | 87 | 1 min. | |
| Control | U | None (sheared) | — | 331 | 30 sec. | Sl. chalky, good texture, thin |
| | V | Surf C | 0.2 | 317 | 30 sec. | No chalky, fast melt, good coat |
| | W | Surf C & D | 0.1 + 0.1 | 278 | 45 sec. | Sl. aftertaste, fast melt, not as smooth |

Control E: dilute 60 parts by weight dry solids of dry debranched starch hydrolysate of Examples 15, 16, 17, 18, or 19 with 400 parts by weight tap water.

Blend F: dilute 57 parts by weight of dry solids of dry debranched starch hydrolysate of Examples 15, 16, 17, 18, or 19 and 3 parts by weight of a low viscosity carboxymethyl cellulose (available from Aqualon Company, Wilmington, Del., as CMC-7LF) with 400 parts by weight with tap water.

Blend G: dilute 57 parts by weight of dry solids of dry debranched starch hydrolysate of Examples 15, 16, 17, 18, or 19 and 3 parts by weight of a high viscosity carboxymethyl cellulose (available from Aqualon Company, Wilmington, Del., as CMC-7HF) with 400 parts by weight with tap water.

Blend H: 58.8 parts by weight of dry solids of dry debranched starch hydrolysate of Examples 15, 16, 17, 18, or 19 and 1.2 parts by weight of a xanthan gum (available from Kelco Division of Merck & Co., San Diego, Calif., as Keltrol TF) diluted to 400 parts by weight with tap water.

The slurries are sheared in the Microfluidizer at 8,000 psig at an output temperature of 56°-60° C. The resulting cremes are diluted to 10% solids and spray dried using a Virtis laboratory spray drier (inlet temp 193° C., outlet 100°-105° C.). The spray dried products are redispersed at room temperature at 20% solids in water using a stirring motor with a low shear agitator stirring at 1,400 rpm for 10 minutes.

Example 24

STELLAR fat replacer powder was mixed with water to give four slurries containing 20% dry solids STELLAR. Glycerol was added to three of the slurries in an amount of 10%, 20% and 30% of the weight of dry STELLAR in the slurry while no glycerol was added to one of the slurries. All the slurries were heated to approximately 50° C. then sheared using the Microfluidizer at 8,000 psi using module #1351. The exit temperature was approximately 60° C. The resulting creme products were spread on stainless steel trays and dried at 35° C. in a forced air oven for 2 days. The dried products were ground to pass through a US #60 mesh sieve then bottled and labeled. To test the ability of the products to rehydrate at minimum shear, water was added to give slurries containing 20% STELLAR dry solids and the slurries were redispersed at room temperature using a Servodyne mixer at 1,500 rpm. Yield stress measurements were obtained on the redispersed products and are reported below.

| Glycerol Used | Yield Stress of Redispersed Product (Pascals) |
| --- | --- |
| 0 | 13 |
| 10 | 123 |
| 20 | 225 |
| 30 | 262 |

It is readily apparent that the addition of glycerol to the STELLAR cremes prior to drying resulted in products that were more readily hydrated at relatively low shear to give increased yield stress values. Based on our experience, we would expect products containing glycerol above about 10%, like those above, to function as fat replacers in food formulations.

Example 25

STELLAR fat replacer neutralized reaction slurry was diluted with water and glycerol to give four slurries containing 10% dry solids STELLAR. Glycerol was added to three of the slurries in an amount of 5% (Blend CC), 10% (Blend DD) and 20% (Blend EE) of the weight of dry STELLAR in the slurry while no glycerol was added to one of the slurries (Control BB) (with a weight for weight reduction in the amount of water, i.e. glycerol replacing water). The slurries were heated to approximately 60° C. then sheared using the Microfluidizer at 4,500 psi. The resulting cremes were diluted to 15% dry solids and then spray dried using the Niro spray dryer described in PCT Publication No. WO 91/12728, discussed above.

Five separate samples of each of the resulting dry products were then redispersed in water at 20% dry solids, one sample by shearing with Microfluidizer at 60° C. and 8,000 psi using Module #1531, two samples with a Servodyne mixer at 1,500 rpm (one sample with water at ambient temperature and one at 60° C.) and two samples with a rotary Oakes mixer, 0.061" rotor at 1,000 rpm (one sample with water at ambient temperature and one at 60° C.). A 20% dry solids slurry of dry granular starch hydrolysate from Run 6F as described in PCT Publication No. WO 91/12728, discussed above, was also prepared without the addition of glycerol (Control FF). The results for each are shown in the Servodyne and Oakes columns, respectively, in the following table with the comparative comments being made with reference to the sample in the table above the subject sample.

surfactants, and mixtures of two or more thereof, effective to improve the redispersibility of said dry blend in a major amount of water comprising:

mixing a minor amount of a hydrophilic agent with a major amount of a fragmented starch hydrolysate in an aqueous environment to form a wet blend thereof, wherein at least about 95% of the fragmented starch hydrolysate has a particle size of less than 45 microns, and wherein the fragmented starch hydrolysate comprises a major amount by weight of cold-water insoluble hydrolysate and a minor amount by weight of cold-water soluble hydrolysate, drying said wet blend at a temperature low enough to prevent the dissolution of a major proportion by weight of said fragmented starch hydrolysate in the water of said aqueous environment, said minor amount of hydrophilic agent being effective to improve the redispersibility of said fragmented starch hydrolysate when a minor amount of said blend is dispersed in a major amount of water.

2. A method of claim 1 wherein said wet blend is comprised of a major proportion by weight of water and a minor proportion by weight of solids from said fragmented starch hydrolysate and said hydrophilic polymer.

3. A method of claim 1 wherein said wet blend is comprised of a major proportion by weight of water and 10% to 30% by weight of solids from said fragmented starch hydrolysate and said hydrophilic polymer.

4. A method of claim 1 wherein said wet blend is comprised of sufficient water to maintain the hydration of the surface of said fragments of starch hydrolysate, to dissolve said hydrophilic polymer, and to distribute said hydrophilic polymer on the surface of the fragments to a degree which will prevent an association between said fragments which inhibits the redispersibility of the fragments.

|       | Microfluidizer | | Servodyne | | | | Oakes | | | |
|       |      |          | Ambient Temp. | | 60° C. | | Ambient Temp. | | 60° C. | |
| Blend | (Pa) | Comments | (Pa) | Comments | (Pa) | Comments | (Pa) | Comments | (Pa) | Comments |
| BB | 530 | Typical STELLAR | 146 | Chalky, thin | 233 | Gritty, thin | | | | |
| CC | 605 | Smoother, more body, good melt | 254 | Possibly chalky, some body | | | | | | |
| DD | 589 | Very smooth, high mouth-coating, lots of body, similar melt to Crisco | 250 | No chalky, more body | 399 | No chalky, good texture, good body | 464 | Sl. chalky, medium body | 734 | very smooth, good mouthfeel, good body |
| EE | 611 | Good characteristics, sweet, good melt, similar to butter | 284 | No chalky, good body, good texture | | | | | | |
| FF | 580 | Good characteristics, good to excellent mouthfeel, better than above | 315 | More body, smooth, better than above, good mouthcoat | 492 | Good character, smooth, excellent body, better than above | 931 | Good body, smooth texture, better than above | 1002 | Smooth, lots of body, more fatty mouthfeel |

What is claimed is:

1. A method of preparing a dry blend of a major amount of a fragmented starch hydrolysate capable of forming a particle gel in aqueous dispersion and a minor amount of a hydrophilic agent selected from the group consisting of hydrophilic polymers and alkane polyols, 5. A method of claim 1 wherein said wet blending comprises fragmentation of said starch hydrolysate in water followed by addition of said hydrophilic polymer to the aqueous dispersion of fragmented starch hydrolysate.

6. A method of claim 1 wherein a portion of the water of said wet blend is removed from said blend prior to drying by reverse osmosis or ultrafiltration of said wet blend.

7. A method of claim 1 wherein said drying is by spray drying, flash drying, tray drying, belt drying, or sonic drying.

8. A method of claim 1 wherein said drying is accomplished with a short retention time and sufficient air flow around the fragments to promote evaporative cooling thereof.

9. A method of claim 1 wherein said drying is effective to reduce the moisture content of the blend to 3% to 8% by weight.

10. A method of claim 1 wherein said hydrophilic agent is edible for humans and is sufficiently soluble in water to effectively disperse the polymer on the surface of the fragments of the starch hydrolysate.

11. A method of claim 1 wherein said hydrophilic agent is a hydrophilic polymer selected from the group consisting of xanthan gum, locust bean, guar gum, cellulose derivatives, and polyoxyalkylenes.

12. A method of claim 1 wherein said hydrophilic agent is an alkane polyol selected from the group consisting of glycerol, propylene glycol, pentaerythritol, sorbitol, mannitol, xylitol, erythritol, and threotol.

13. A method of claim 1 wherein said hydrophilic agent is a surfactant having a hydrophile lipophile balance of at least about 6.

14. A method of claim 1 wherein said hydrophilic agent is present in the dry blend in an amount of 1% to 30% by weight of the total dry solids of said dry blend.

15. A method of claim 1 further comprising redispersing the dry blend in water and wherein said hydrophilic polymer is present in the dry blend in an amount insufficient to destroy the particle gel character of the resulting redispersion.

16. A method of claim 1 wherein said starch hydrolysate is a granular starch hydrolysate.

17. A method of claim 1 wherein starch hydrolysate is a granular starch hydrolysate composition consisting essentially of a major amount by weight of cold-water insoluble hydrolysate and a minor amount by weight of cold-water soluble hydrolysate, said dry, granular starch hydrolysate having weight average molecular weight of from about 4,000 g/mol to about 7,500 g/mol.

18. A method of claim 1 wherein said starch hydrolysate consists essentially of (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of a cold-water soluble hydrolysate, and (ii) a minor amount of salt selected from the group consisting of alkali metal chlorides, alkali metal sulfates, alkaline earth metal chlorides, alkaline earth metal sulfates, and mixtures of two or more thereof, said salt being present in an amount sufficient to produce an organoleptically fat-like aqueous dispersion upon fragmentation of said composition in an essentially aqueous medium at about 20% dry solids of said starch hydrolysate.

19. The method of claim 18 wherein said salt is present in an amount of at least 0.1% basis dry weight of said granular starch hydrolysate.

20. The method of claim 18 wherein said salt is sodium chloride.

21. A method of claim 1 wherein said starch hydrolysate is a debranched starch hydrolysate.

22. A method of claim 1 further comprising redispersing the dry blend in water and wherein the resulting redispersion exhibits a transition in dynamic elastic modulus versus shear strain from substantially constant dynamic elastic modulus to decreasing dynamic elastic modulus, said transition being exhibited at a shear strain of less than about 50 millistrain.

23. A method of claim 1 wherein said starch hydrolysate is derived from starch from a variety of Zea mays.

24. A method of claim 1 wherein said starch hydrolysate is derived from a starch consisting essentially of amylopectin.

25. A method of claim 1 wherein said starch hydrolysate is derived from a high amylose starch.

26. A method of claim 1 wherein said starch hydrolysate is a debranched amylopectin starch composed of more than about 80% by weight short chain amylose.

27. A method of claim 1 wherein said starch hydrolysate is a debranched amylopectin starch essentially free of amylopectin having a molecular weight in excess of 20,000 g/mol.

28. A composition of matter comprising a major amount of a fragmented starch hydrolysate capable of forming a particle gel in aqueous dispersion and a minor amount of a hydrophilic polymer, said minor amount of hydrophilic polymer being effective to improve the redispersibility of said fragmented starch hydrolysate when a minor amount of said blend is dispersed in a major amount of water, wherein at least about 95% of the fragmented starch hydrolysate has a particle size of less than 45 microns, and wherein the fragmented starch hydrolysate comprises a major amount by weight of cold-water insoluble hydrolysate and a minor amount by weight of cold-water soluble hydrolysate.

29. A method of forming a particle gel comprising mixing a composition of matter comprising a major amount of a fragmented starch hydrolysate capable of forming a particle gel in aqueous dispersion and a minor amount of a hydrophilic polymer, wherein at least about 95% of the fragmented starch hydrolysate has a particle size of less than 45 microns, and wherein the fragmented starch hydrolysate comprises a major amount by weight of cold-water insoluble hydrolysate and a minor amount by weight of cold-water soluble hydrolysate, said minor amount of hydrophilic polymer being effective to improve the redispersibility of said fragmented starch hydrolysate when a minor amount of said blend is dispersed in a major amount of water, wherein the shear employed to form such particle gel is less than the shear needed to form a particle gel having the same gel strength as a particle of the fragmented starch hydrolysate alone.

30. A method of formulating a food containing a fat and/or oil ingredient comprising replacing at least a substantial portion of said fat and/or oil ingredient with a composition of matter comprising a major amount of a fragmented starch hydrolysate capable of forming a particle gel in aqueous dispersion and a minor amount of a hydrophilic polymer, wherein at least about 95% of the fragmented starch hydrolysate has a particle size of less than 45 microns, and wherein the fragmented starch hydrolysate comprises a major amount by weight of cold-water insoluble hydrolysate and a minor amount by weight of cold-water soluble hydrolysate, said minor amount of hydrophilic polymer being effective to improve the redispersibility of said fragmented starch hydrolysate when a minor amount of said blend is dispersed in a major amount of water.

31. A food formulation having a reduced level of fat and/or oil comprising a mixture of a foodstuff and a blend composition as a replacement for at least a substantial portion of the fat and/or oil of said food formulation, said blend composition comprising a major amount of a fragmented starch hydrolysate capable of forming a particle gel in aqueous dispersion and a minor amount of a hydrophilic polymer, wherein at least about 95% of the fragmented starch hydrolysate has a particle size of less than 45 microns, and wherein the fragmented starch hydrolysate comprises a major amount by weight of cold-water insoluble hydrolysate and a minor amount by weight of cold-water soluble hydrolysate, said minor amount of hydrophilic polymer being effective to improve the redispersibility of said fragmented starch hydrolysate when a minor amount of said blend is dispersed in a major amount of water.

32. A method of making a composition of matter useful in replacing fat and/or oil in a food formulation comprising:
    gelatinizing a starch having an amylopectin component;
    debranching the amylopectin in said gelatinized starch in a debranching medium to convert more than about 80% by weight of the amylopectin to short chain amylose and form a debranched amylopectin starch in said medium, wherein the debranched amylopectin starch comprises a major amount by weight of cold-water insoluble hydrolysate and a minor amount by weight of cold-water soluble hydrolysate;
    fragmenting by mechanical disintegration a minor amount of said dried debranched amylopectin starch in a major amount of an aqueous liquid, wherein at least about 95% of the fragmented debranched amylopectin starch has a particle size of less than 45 microns, said fragmenting being effective to form a particle gel of said composition;
    mixing a minor amount of a hydrophilic polymer with a major amount of a fragmented starch hydrolysate in an aqueous environment to form a wet blend thereof;
    drying said wet blend at a temperature low enough to prevent the dissolution of a major proportion by weight of said fragmented starch hydrolysate in the water of said aqueous environment, said minor amount of hydrophilic polymer being effective to improve the redispersibility of said fragmented starch hydrolysate when a minor amount of said blend is dispersed in a major amount of water.

33. A method of preparing a dry blend of a major amount of a fragmented starch hydrolysate capable of forming a particle gel in aqueous dispersion and a minor amount of a hydrophilic agent selected from the group consisting of hydrophilic polymers and alkane polyols, surfactants, and mixtures of two or more thereof, effective to improve the redispersibility of said dry blend in a major amount of water comprising:
    mixing a minor amount of a hydrophilic agent with a major amount of a starch hydrolysate, wherein the starch hydrolysate comprises a major amount by weight of cold-water insoluble hydrolysate and a minor amount by weight of cold-water soluble hydrolysate,
    fragmenting the mixture by mechanical disintegration in an aqueous environment to form a wet blend which comprises a major amount of a fragmented starch hydrolysate and a minor amount of a hydrophilic agent, wherein at least about 95% of the fragmented starch hydrolysate has a particle size of less than 45 microns, and
    drying said wet blend at a temperature low enough to prevent the dissolution of a major proportion by weight of said fragmented starch hydrolysate in the water of said aqueous environment, said minor amount of hydrophilic agent being effective to improve the redispersibility of said fragmented starch hydrolysate when a minor amount of said blend is dispersed in a major amount of water.

* * * * *